Dec. 17, 1957 L. E. KAAP 2,816,841
METHOD AND APPARATUS FOR PROCESSING MATERIAL
IN SEALED CONTAINERS
Filed Oct. 28, 1953 5 Sheets-Sheet 1

FIG. I.

INVENTOR.
LAWRENCE E. KAAP

BY W. D. O'Connor
ATTORNEY

Dec. 17, 1957  L. E. KAAP  2,816,841
METHOD AND APPARATUS FOR PROCESSING MATERIAL
IN SEALED CONTAINERS
Filed Oct. 28, 1953  5 Sheets-Sheet 2

INVENTOR.
LAWRENCE E. KAAP
BY W. D. O'Connor
ATTORNEY

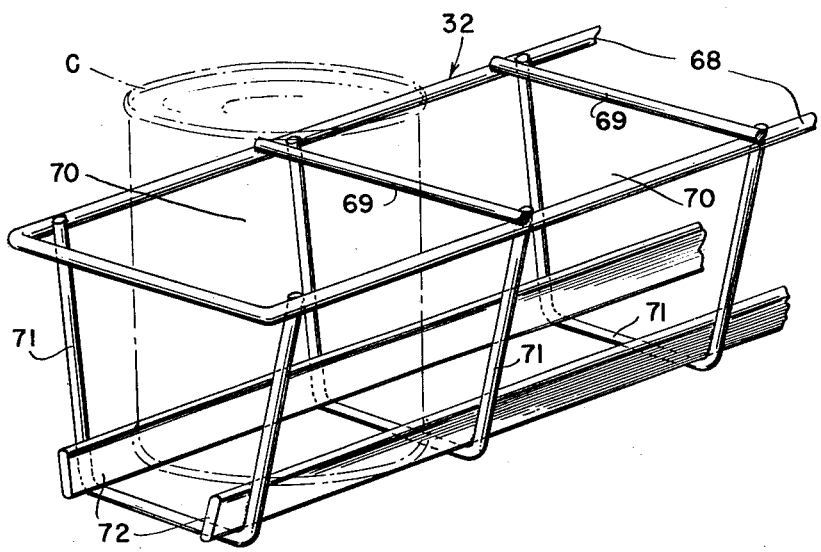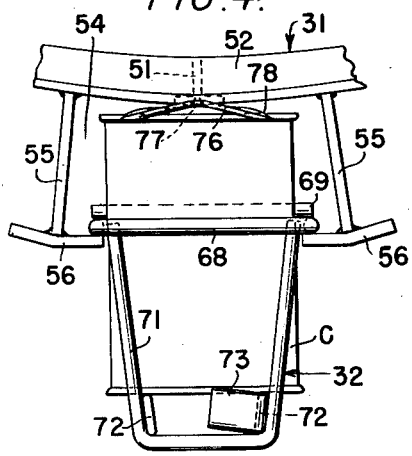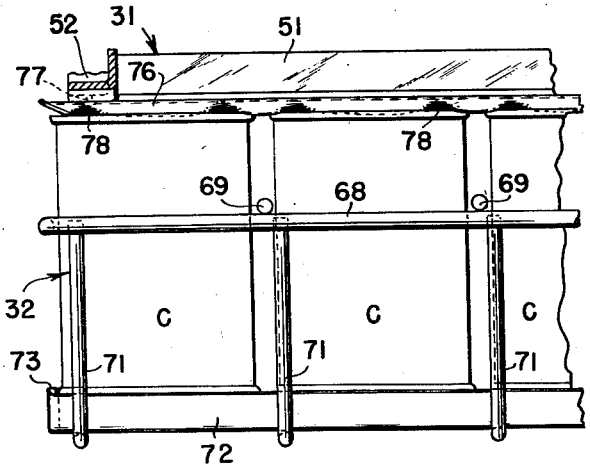

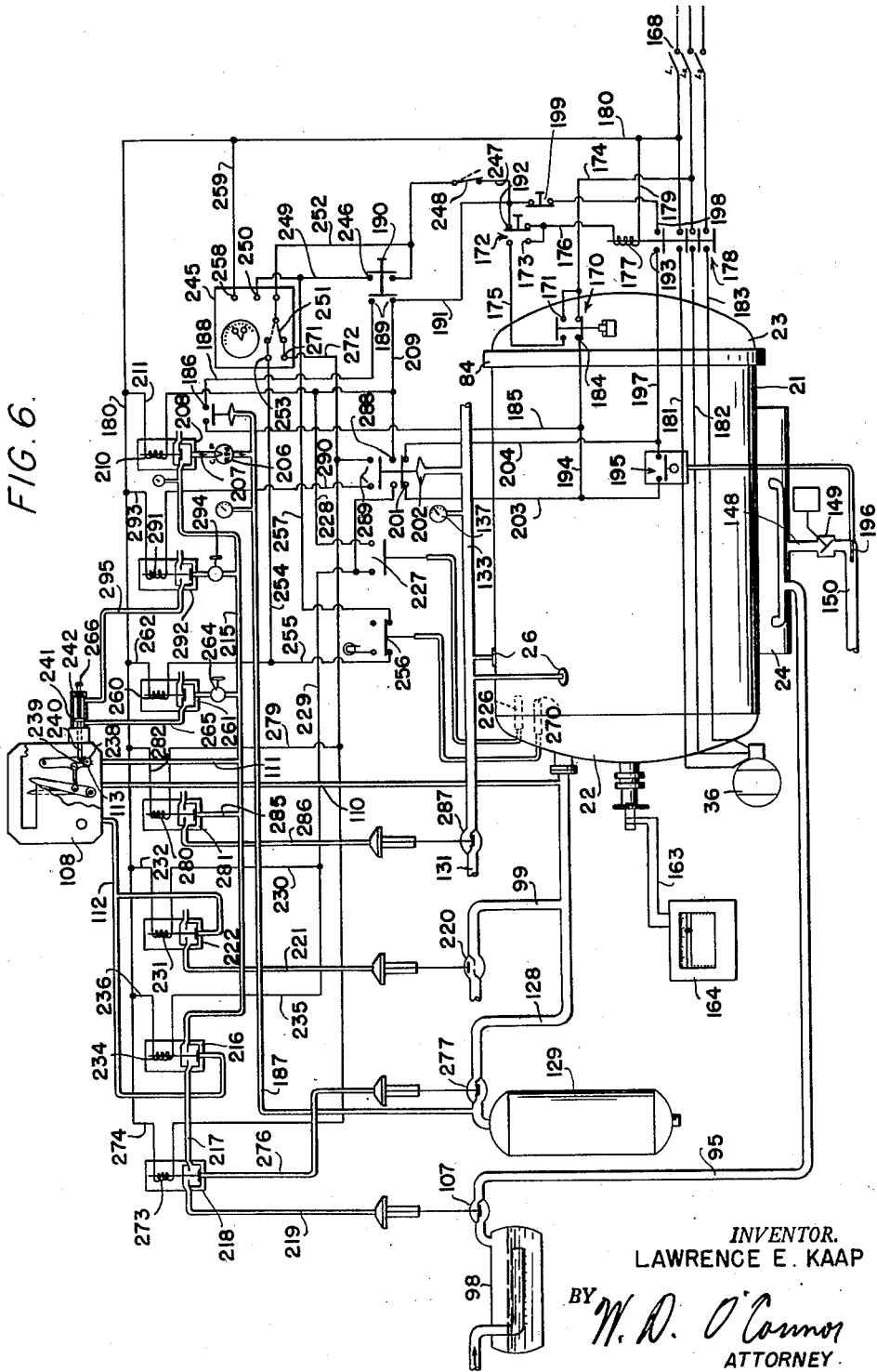

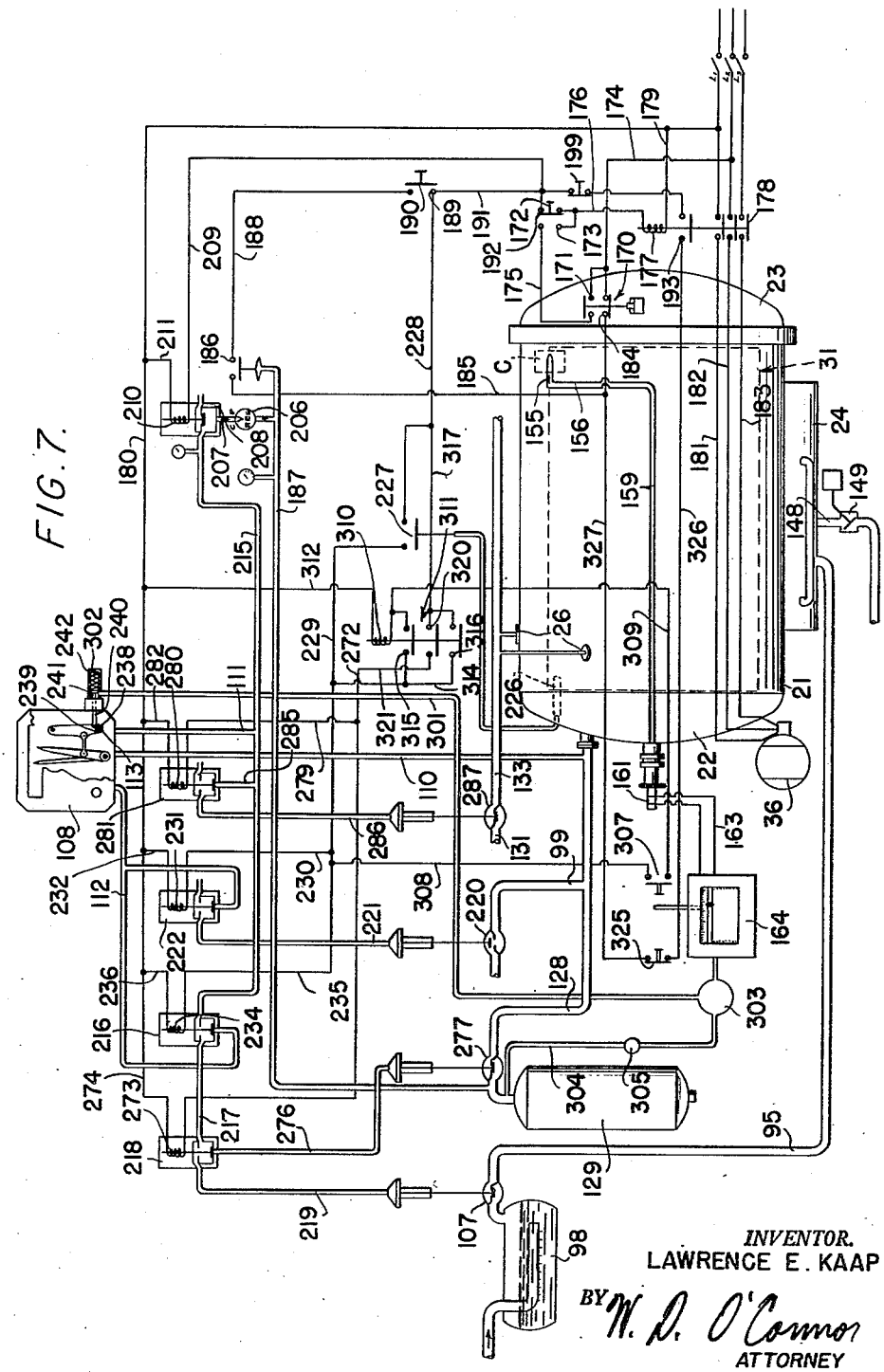

United States Patent Office 2,816,841
Patented Dec. 17, 1957

2,816,841

METHOD AND APPARATUS FOR PROCESSING MATERIALS IN SEALED CONTAINERS

Lawrence E. Kaap, Milwaukee, Wis., assignor, by mesne assignments, to Food Machinery & Chemical Corporation, San Jose, Calif., a corporation of Delaware Application October 28, 1953, Serial No. 388,747

22 Claims. (Cl. 99—214)

This invention relates, generally, to the art of processing comestibles and the like and more particularly to improved methods of and apparatus for heat processing materials confined in containers, such as food products packed in sealed cans.

In processing material sealed in containers, the contents of the containers are ordinarily heated to a specified sterilizing temperature and then held at that temperature for a predetermined period of time. For best results, the heating of the entire contents of each container should be effected as quickly and uniformly as possible and the material then cooled as quickly as possible to complete the process. Rapid heating and cooling of the container contents results in products of better quality and furthermore shortens the processing time thereby reducing the cost of processing.

A new method for achieving rapid heating and cooling of the entire contents of a sealed container is disclosed in U. S. Patent No. 2,517,542, issued August 8, 1950, to La Verne E. Clifcorn et al. In accordance with this new method, sealed containers of food products are revolved end-over-end in a vertical plane while subjected to the effects of a heat transferring medium, the speed of revolution being such that the headspace bubble in each container moves through the contents in a manner to stir or agitate them for accelerating the rate of heat transfer between the contents and the container walls.

It is a general object of the present invention to provide improved arrangements for processing containers of mobile material in the most expeditious and efficacious manner.

Another object of the present invention is to provide improved apparatus of simple and rugged construction for processing material in accordance with the Clifcorn et al. method of end-over-end agitation.

Another object of the invention is to provide an improved agitating sterilizer arranged for revolving containers of material end-over-end to effect optimum agitation of the material while subjecting it to heating or cooling influences.

Another object is to provide an improved cooking or sterilizing apparatus for processing food in containers while revolving them, that is adapted to receive the containers in groups arranged in rows in portable baskets.

Another object is to provide an improved control system for regulating the processing cycle in an agitating sterilizer operating in accordance with the end-over-end principle of agitation.

Another object of the invention is to provide an improved automatic control system for regulating the processing cycle of a pressure sterilizer.

A further object of the invention is to provide automatically operating apparatus for controlling a sterilizing process in accordance with the actual temperature within a container of the material being sterilized.

A still further object is to provide improved methods of sterilizing materials confined in sealed containers.

In accordance with this invention, the improved agitating sterilizer includes the usual cylindrical retort that houses a rotatable reel adapted to support on its periphery a batch of containers arranged with their axes disposed radially of the axis of rotation for end-over-end agitation. The reel periphery is provided with longitudinal slots each of which receives a basket containing a row of cans or like containers of food being processed, the baskets being slid endwise into or out of the slots for loading or unloading the apparatus. Suitable control valves are provided for admitting steam to heat the material and for introducing water spray to cool the containers while they are being rotated end-over-end at a speed to effect optimum agitation of their contents. A thermocouple in one of the containers may be connected to indicate the actual temperature of the contents during the entire process for the guidance of the operator in effecting heating and cooling as rapidly as possible to achieve a superior sterilization result without damaging the container or the contents. The operation of the control valves and the like may be effected manually or they may be operated automatically through an improved control system, timers being provided for regulating the various phases of the sterilizing cycle. Alternatively, the control system may be arranged to operate directly in accordance with the temperature of the material within a container being processed as sensed by the thermocouple in the container.

The foregoing and other objects of this invention will become more fully apparent as the following detailed description of an exemplary embodiment thereof in an improved agitating sterilizer is read in conjunction with the accompanying illustrative drawings, wherein:

Fig. 3 is an enlarged view in perspective of part of a container retaining basket that is shown supporting containers on the rotor of the sterilizer in Figs. 1 and 2;

Fig. 4 is a view in end elevation of a container basket together with parts of the sterilizer rotor and illustrating an arrangement for restraining the containers against endwise movement;

Fig. 5 is a view in side elevation of the container basket and parts of the reel and showing the container restraining arrangement illustrated in Fig. 4;

Fig. 6 is a schematic diagram of an improved automatic control system for the agitating sterilizer; and, Fig. 7 is another schematic diagram illustrating a modified automatic control system.

Figure 1:
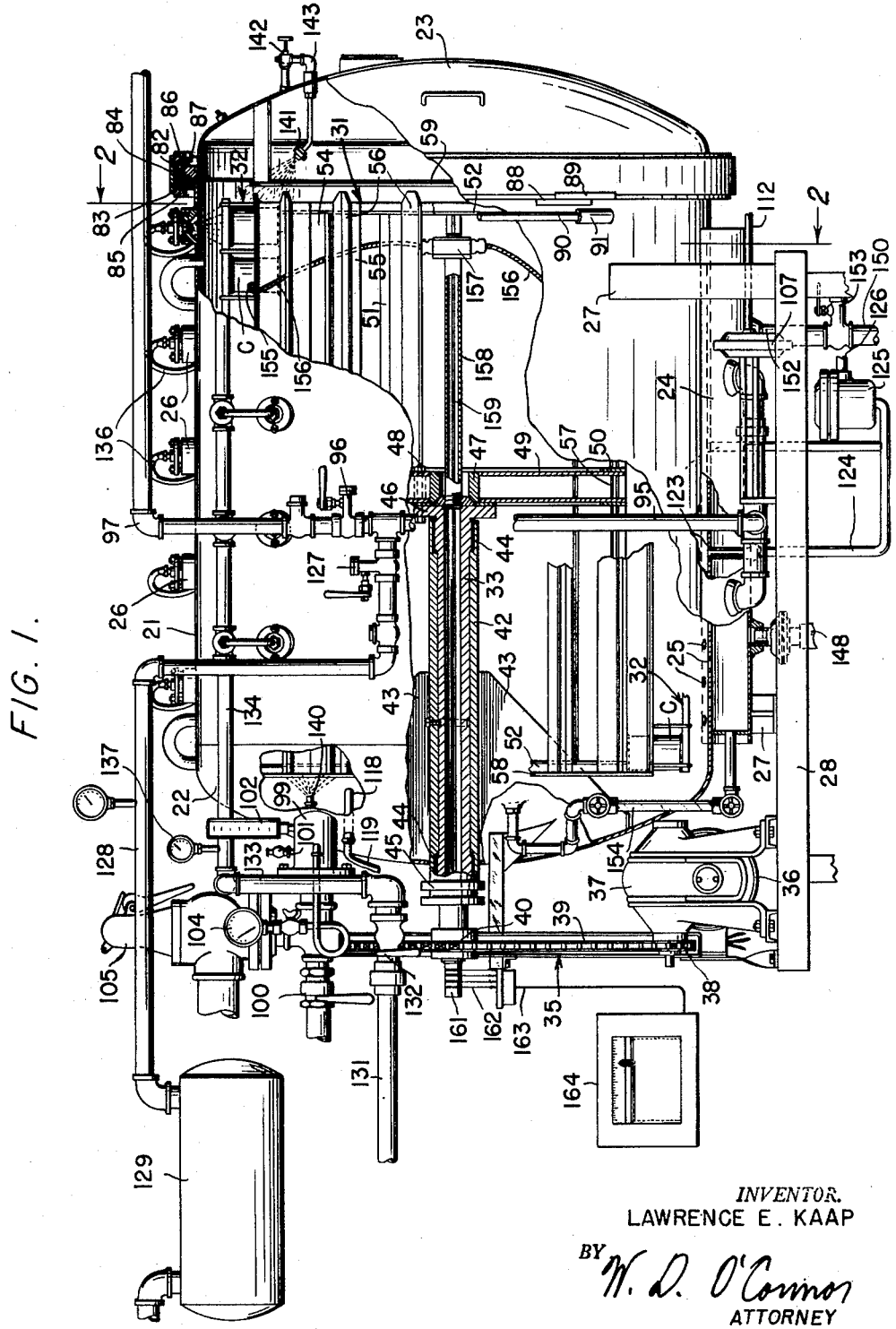
Figure 1 is a view, generally in side elevation, of an improved agitating sterilizer embodying the present invention, with part of the housing broken away and some internal parts shown in longitudinal section.

The improved agitating sterilizer shown in the drawings as exemplifying the present invention, is especially adapted for heat processing material sealed in containers while the material is being agitated by end-over-end rotation of the containers. In operating the sterilizing apparatus, sealed containers of food or the like to be pressure cooked and sterilized are loaded into the machine in a batch and are then rotated end-over-end for agitation of their contents while being processed. The agitation serves to facilitate heating the entire contents rapidly to a predetermined sterilizing temperature and also to facilitate the subsequent rapid cooling of the contents to diminish risk of deterioration after removal from the apparatus. As more fully explained in the previously mentioned Clifcorn et al. Patent No. 2,517,542, mobile material confined with headspace in sealed containers may be agitated effectively during processing by revolving the containers end-over-end about a horizontal axis at a speed selected to cause the headspace to move through the material in a manner to stir it. By this arrangement, all parts of the contents are brought into contact with the container walls for heating while at the same time no portion is allowed to remain in contact therewith long enough to overheat or burn the material.

Figure 2:
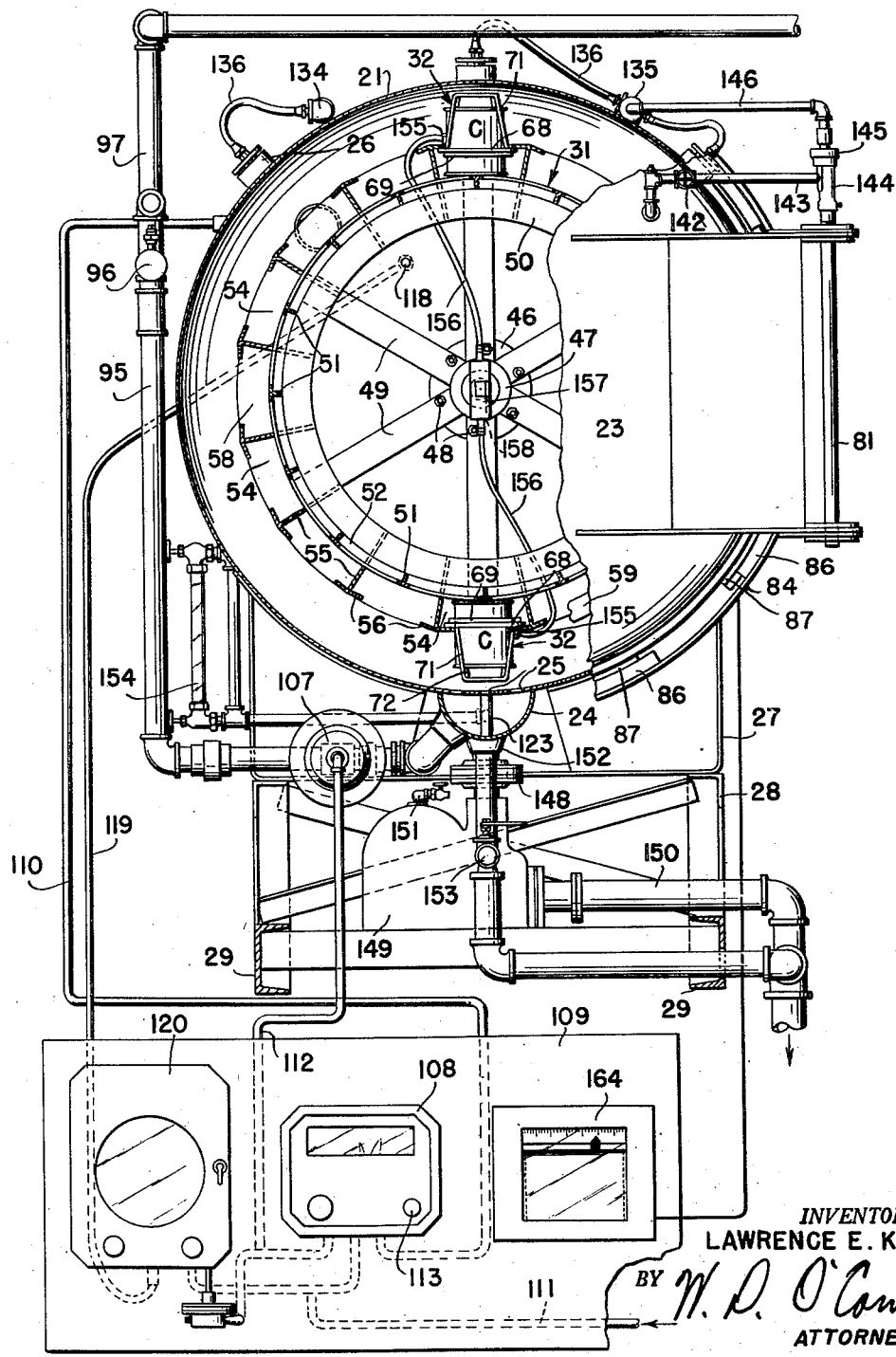
Fig. 2 is a view largely in transverse section through the sterilizer, taken generally on the plane represented by the line 2—2 in Fig. 1.

Referring more specifically to the drawings and particularly to Figs. 1 and 2 thereof, the improved agitating sterilizer comprises essentially a pressure vessel formed generally by a horizontally disposed cylindrical shell or housing 21 and constituting a retort or autoclave that is closed at one end by a dished head 22. The other end of the cylindrical shell is provided with a large hinged door 23 similar in shape to the head 22 and that may be swung to open position or clamped in closed position to retain steam under pressure in the retort for cooking and sterilizing the material being treated.

Heating steam is admitted to the retort by means of a semi-cylindrical trough-like header 24 extending along and secured to the lower surface of the housing 21 and that has communication with the pressure chamber through a series of spaced holes 25 in the bottom of the housing shell. Water for cooling the material after sterilizing is admitted through a plurality of spaced spray nozzles 26 arranged in the upper part of the housing. The cylindrical housing 21 is supported near each end upon a cradle member 27 that is carried by and forms part of a fabricated frame or base 28 mounted on skids 29 and constituting the foundation for the sterilizer.

Containers C, for example sealed cylindrical metal cans each enclosing a quantity of food or similar material being treated together with a suitable headspace, are supported for end-over-end rotation within the housing shell 21 with their axes disposed radially of the housing axis. Instead of metal containers, it should be understood that containers of glass or other substance may be processed in the same manner. As shown, the containers are carried upon the periphery of a cylindrical rotor or reel 31 that is mounted for rotation about the horizontal longitudinal axis of the housing. For convenience in loading and unloading successive batches of material being processed on the reel, groups of individual containers C are carried in portable baskets 32 extending longitudinally of and removably secured to the outer surface of the reel 31.

The container-carrying rotor or reel 31 is supported upon the inwardly extending end of a hollow driving shaft or axle 33 that projects through and is rotatably carried in the dished head 22 constituting the left end of the housing as seen in Fig. 1. At its outer end, the driving shaft 33 is operatively connected by a power transmitting mechanism 35 to be driven by an electric motor 36, the mechanism 35 being arranged to provide the necessary reduction in speed between the motor 36 and the container supporting rotor 31. As shown, the motor 36 is connected to drive a gear reduction mechanism 37 constituting part of the power transmitting mechanism, both the motor and the mechanism 37 being mounted on a part of the frame or base 28 that projects from beneath the dished head 22. The motor 36 or the gear reduction mechanism 37 may be of the variable speed type for adjustment to vary the speed of rotation of the reel 31. The gear reduction unit 37 is provided with a driving sprocket 38 which transmits power through a chain 39 to a larger sprocket 40 fixed on the outer end of the reel shaft 33.

The reel carrying shaft 33 passes through the center of the dished head 22 and extends into the housing 21 to the mid-portion thereof, the shaft being rotatably supported within a tubular supporting casing or cannon bearing 42 that provides a rigid cantiliver structure whereby the reel 31 is supported and driven at its mid-portion rather than at one end. As shown in Fig. 1, the tubular bearing support 42 extends through and is rigidly fixed in the dished head 22 and is reinforced by angularly spaced gusset plates 43 of generally triangular shape extending radially from the tubular casing and secured to the inner surface of the head 22. The tubular casing or shaft support 42 is provided within each end with a suitable bearing 44, the two bearings cooperating respectively with complementary journals near the respective ends of the reel shaft 33. A suitable packing gland 45 is provided at the outer end of the tubular casing 42 to effect sealing engagement with the rotary shaft 33 for preventing leakage of pressure fluid from within the housing 21.

The inner end of the shaft 33 is provided with a radially extending flange 46 to which a supporting hub element 47 of the reel 31 is secured by bolts 48. As best shown in Fig. 2, six spokes 49 of I-beam section extend radially from the hub 47 and are connected together at their outer ends by a pair of annular rings 50 secured to the respective sides of the spoke ends and disposed radially to constitute a wheel structure in the mid-plane of the reel. A plurality of angularly spaced longitudinal ribs 51 in the form of small T-bars are secured at their ends to the rings 50 and extend in opposite directions therefrom in aligned pairs joined by short bridging pieces or inserts welded between the rings 50 to define the body of the reel. Circular end rings 52 are joined to the outer ends of the longitudinal ribs 51 at each end of the reel to complete the configuration of a rotor of squirrel cage construction.

As best shown in Fig. 2, the aligned longitudinal T-bar ribs 51 are positioned to be engaged by the inner ends of the cans C arranged in rows in the baskets 32. In the particular structure shown, the apparatus is capable of processing sixteen baskets of cans at a time, there being sixteen of the equally spaced longitudinal ribs 51 on the surface of the reel.

The can baskets 32 are received in longitudinal trackways or slots 54 formed between radially projecting basket retaining ribs or fins 55 each provided along its outer edge with a cross bar or strip 56. Each rib 55 and its cross bar 56 forms a T-section basket retaining member extending the full length of the reel 31, and disposed between and outwardly of adjacent longitudinal ribs 51. As shown in Fig. 2, the inner edges of the ribs 55 engage the peripheries of the end rings 52 and of the central rings 50 at positions equally spaced between the T-bar ribs 51 and are secured to them by welding. Furthermore, radially disposed reinforcing strips 57 are welded between the two central rings 50 beneath each of the ribs 55 to strengthen the structure.

As appears in Fig. 2, the edges of the cross bars 56 of each pair of adjacent ribs 55 constitute ledges arranged to engage the opposite edges of the rim of a can basket 32 in a manner to retain the basket in the slot 54 against outward radial displacement when the reel is rotating. Likewise the ledges exert peripheral rotational forces on the sides of the baskets to rotate them with the reel. At the inner or left hand end of the reel as shown in Fig. 1, the can receiving trackways or slots 54 between the ribs 55 are closed by an annular stop ring or end ring 58 that is welded to the ribs 55 and is positioned to be contacted by the inner end of each basket 32 when the baskets are slid into the slots 54 of the reel. A generally similar smooth retaining ring 59 fixed on the inside of the door 23 moves into position, when the door is closed, to constitute a barrier that prevents the baskets from moving endwise out of the slots 54 in the reel during rotation.

As best shown in Fig. 3, each can basket 32 is provided at its top edge with a rim formed by a round rod 68 that extends along each side and across each end of the basket in the form of an elongated rectangle. As best shown in Fig. 4, the respective sides of the rim of the basket formed by the rod 68 rest upon the inner surfaces or edges of adjacent cross bars 56 of the basket retaining ribs 55 when the basket is in operating position on the reel. The rods 68 forming the respective sides of the basket rim are joined by spaced cross rods or bars 69 positioned to form therewith square pockets 70 each of the proper size to receive a can C of the material being processed. From the ends of each of the cross bars 69, the legs of a bent rod 71 in the form of a yoke of generally U-shape depend from the rim in a manner to define the sides and bottom of the basket 32. Within the lower corners of the yokes 71 are secured longitudinal flat bars 72 disposed on edge in parallel spaced relationship forming the bottom of the basket and functioning as beam members to receive and support the outer ends of the cans C in a manner to restrain them against centrifugal force when they are rotating upon the reel 31. As shown in Fig. 4, one of the flat bars 72 may be bent over at one end to form a tab 73 that serves to identify the basket 32 as one of a predetermined group.

The various rods and bars making up the basket 32 are preferably joined by welding to constitute a strong but light structure adapted for retaining a row of cans C on the periphery of the reel 31 while under centrifugal action. Although adequately strong, the baskets are light and convenient to handle in loading and unloading a batch of cans being processed. Furthermore, both the baskets 32 and the reel 31, being formed of relatively thin bars, offer only the minimum of obstruction to the flow of steam and water into contact with the cans C during processing.

The baskets 32 and the basket retaining ribs 55 are formed to receive cans C of a specific size and shape. When it is desired to adapt the machine for processing cans of a different size or shape, the machine is fitted with another reel 31 equipped with baskets of suitable size. For this purpose the reel 31 may be removed from within the housing 21 by first removing the bolts 48 which secure the hub 47 to the flange 46 of the shaft 33 and then withdrawing the reel structure endwise through the open end of the housing. Another reel presenting slots 54 adapted to carry baskets 32 fitting the cans of the new size to be processed may then be introduced into the housing 21 and secured to the shaft flange 46 by means of the bolts 48. The different reels are arranged to hold the particular cans of various sizes with the outer ends of all the cans at equal distances from the center of rotation.

According to a modified or improved form of the reel and basket arrangement, illustrated in Figs. 4 and 5, the containers C are restrained against endwise shifting movement in the baskets while rotating with the reel 31 in order to protect them from possible abrasion. This arrangement is particularly useful when processing cans having lithographed labels or similar easily damaged surfaces. Since centrifugal force tends to hold the containers outward, the restraining means is arranged to prevent gravity from moving them inward toward the surface of the reel when they are in the upper position in the housing. For this purpose an outwardly acting restraining force equal to only about 20 percent of the weight of the filled container when added to the centrifugal force is sufficient to prevent the longitudinal inward movement of the cans when the reel is rotating at processing speed. As shown in Figs. 4 and 5, this restraining force is provided by a formed leaf spring 76 secured to and extending longitudinally of each reel T-bar or rib 51, the spring being of width somewhat less than the width of the cans. As indicated in Fig. 5, the springs 76 extend from one end of each T-bar 51 to the other and each spring is secured at intervals along its length to the face of the T-bar 51 by screws 77. Each spring 76 is bent longitudinally as shown in Fig. 4 in such a manner that its sides slant away from the rib 51 circumferentially at each side thereof a sufficient amount to engage its flexible outer edges 78 with the beads at the inner ends of the containers. The extending flexible edge portions 78 of the springs 76 thus engage the adjacent edges of the beads of each container at four spaced positions. By this arrangement each of the containers is forced outwardly by spring pressure at four points on its inner bead to hold its outer end in contact with the longitudinal bars 72 of the basket 32, the arrangement being such that the force of gravity will not cause the cans to drop inwardly when at the top of the circle of revolution. Since the springs are of flexible material and disposed longitudinally of the reel and since they are not required to exert strong pressure, a basket 32 of cans may be slid readily into a slot 54 of the reel with the can beads deflecting the flexible edges 78 of the springs 76 as they slide along them. When the basket arrives at its operating position, the edges 78 of the spring 76 engage the beads of the entire row of cans and restrain the cans from any motion that might otherwise result in scratching the labels.

The door 23 which carries the ring 59 for retaining the can baskets in operating position and that seals the pressure chamber is of the quick opening type. As shown in Figs. 1 and 2, the door 23 is carried by a hinge structure 81 that is adjustable and loosely fitted to enable the door to fit evenly and securely upon a gasket 82 carried on the outer face of a flange 83 encircling the open end of the housing shell 21. For retaining the door 23 in tight sealing engagement with the gasket 82 against fluid pressure within the housing 21, there is provided a rotatable clamping or locking ring 84 which loosely encircles the flange 83. The ring 84 is provided at its inner edge with a flange forming an inturned lip 85 that engages the side of the flange 83 opposite from the gasket 82. The other or outer edge of the locking ring 84 is provided with a series of inwardly projecting spaced or discontinuous wedging blocks 86, the spacing between the blocks being slightly greater than the length of each block. The periphery of the door 23 is likewise provided with outwardly projecting complementary interlocking wedging blocks 87, the arrangement being such that when the door is swung closed the outwardly projecting wedging blocks 87 thereon may pass through the spaces between the inwardly projecting wedging blocks 86 of the locking ring 84 to the position shown in Fig. 1. By rotating the ring 84 upon the flange 83, the wedging blocks 86 are then caused to engage and interlock with the wedging blocks 87 on the door in a manner to effect a wedging or discontinuous multiple screw threaded action that forces the face of the door into tight contact with the gasket 82 and securely retains it on the end of the housing 21 against the pressure of the fluid within the pressure chamber.

To assist in turning the locking ring 84 for effecting the sealing action, the housing is provided with a fulcrum member 88 secured to the shell 21 in cooperating relationship with an abutment member 89 on the ring 84. The fulcrum and the abutment are preferably provided with a series of openings that may be loosely engaged by one end of a lever or bar 90 whereby a prying action may be effected to turn the ring and tighten the door against the flange 83. A suitable parking socket 91 is provided on the housing 21 adjacent to the fulcrum 88 for receiving the lever 90 when it is not in use.

After the door 23 has been closed and sealed, steam for heating the contents of the containers is admitted through the header 24 and the holes 25 at the bottom of the housing 21, as previously mentioned. The steam enters the header 24 through a vertically disposed pipe 95 that is connected by a manually operated quick opening selector valve 96 with a steam supply line 97. The supply line 97 is fed from a source having adequate capacity for quickly filling the housing 21 with steam at the required pressure. If required, a steam accumulator 98 may be provided in the steam line 97, as indicated diagrammatically in Fig. 6, to relieve the steam generator of the intermittent peak demands that occur when the valve 96 is opened to admit steam to the housing in heating successive batches of containers being processed.

Otherwise peak steam demands of short duration may tend to interfere with the supply of steam for other purposes and with normal boiler operation since the rate of firing cannot be adjusted quickly enough to meet them.

As the steam is admitted through the selector valve 96 and the header 24, air trapped within the housing 21 is released through a vent header 99 that is connected with and extends outwardly from the dished head 22 forming the closed end of the housing. As shown, the vent header 99 is provided with a manually actuated vent valve 100 and a small bleeder valve or pet cock 101. The vent valve 100 may be closed after most of the air has been released whereupon the remaining air escapes more slowly through the bleeder valve 101 as the pressure of the steam increases within the housing. A thermometer 102 on the header 99 serves to indicate the temperature of the steam within the housing. A pressure gauge 104 also connected to the header 99 indicates the steam pressure and a safety valve 105 on the header 99 provides for the release of excess pressure from within the housing in an emergency.

As shown in Figs. 1 and 2, the vertical supply pipe 95 is connected at its lower end with a pneumatically actuated pressure regulating valve 107 that is interposed between the pipe and the header 24 and connected as shown in Fig. 2 to be actuated by an automatic pressure responsive control apparatus 108 for controlling the admission of pressure fluid into the housing. The automatic control apparatus 108 is arranged to respond to the pressure of the fluid within the housing 21 and functions to control the inflow of the steam or other fluid through the pressure regulating valve 107. The control apparatus or pressure responsive instrument 108 is mounted on a control panel 109 and is connected by control piping 110 with the interior of the housing 21 for operating in response to the fluid pressure therein.

Air under pressure for actuating the pressure regulating valve 107 is received from a source of supply through a conduit 111 that is connected to the instrument 108, the air being admitted by action of the instrument into a conduit 112 that connects to the pressure control valve 107. Thus when the pressure within the housing 21 increases to a predetermined maximum, the pressure responsive instrument 108 operates to close the pressure regulating valve 107 to prevent the entrance of additional steam, the instrument 108 functioning automatically to admit additional steam through the pressure regulating valve 107 whenever the pressure within the housing 21 drops below the predetermined maximum.

A control knob 113 on the instrument 108 may be turned by the machine operator to change the pressure setting or control point at which the instrument will operate the pressure regulating valve 107 to shut off the supply of fluid pressure. By this arrangement, the pressure to be maintained within the housing may be established to fit the circumstances and may be increased or decreased at any desired rate by turning the knob 113.

A temperature sensing bulb 118 secured in the dished head 22 of the housing and projecting into the pressure chamber is connected by a flexible conduit 119 to a temperature responsive recording instrument 120 also mounted on the control panel 109. Although the temperature and pressure of steam confined as within the housing 21 are looked upon as being interchangeable characteristics, it is preferable that the automatic control apparatus 108 be responsive to the pressure of the steam or other fluid. This permits the use of the same control apparatus for controlling the pressure of air in the retort during the cooling phase of the cycle.

Accordingly, the admission of steam into the housing 21 is controlled by the adjustable pressure responsive instrument 108 while the temperature of the steam within the housing is indicated by the thermometer 102 and recorded on the temperature responsive recording instrument 120. By observing these instruments the operator can be assured that the proper temperature conditions have been established within the retort. However, if desired, the temperature responsive instrument may be connected in the control system in the manner indicated in Fig. 2 to effect the control of the admission of steam in accordance with the temperature within the housing during the heating phase of the processing cycle.

Water condensing from the steam within the housing 21 as the apparatus and its load of cans absorb heat from the steam, flows to the bottom of the housing and drains away through two drain openings 123, the incoming steam preventing the water from draining back through the holes 25. The condensate drain holes 123 are connected by pipes 124 to a suitable steam trap 125 that operates in a well-known manner to permit the water to drain away but closes automatically to prevent the escape of steam after the water has been drained. The steam trap 125 is connected to a discharge pipe 126 which is preferably arranged to return the condensate to the steam boiler feed water system.

After the material in the containers C has been subjected to the heating effect of the steam at full predetermined pressure for a predetermined time sufficient to effect sterility, the manually operated steam selector valve 96 may be closed to cut off the supply of further steam while rotation of the containers on the reel is continued. The pressure within the housing is then maintained by immediately opening a manually operated quick opening selector valve 127 to admit air under pressure into the vertical pipe 95 leading to the pressure regulating valve 107 and the header 24, the air replacing the steam within the housing 21 as it condenses. The air under pressure is supplied through a suitable pipe line 128 leading from an accumulator or pressure tank 129 that supplies sufficient air to replace quickly all of the steam in the housing 21 as it condenses. By this arrangement, pressure equal to the steam processing pressure may be maintained on the exterior of the containers C by operation of the controller 108 to counterbalance the pressure within the containers, whereby the containers are protected from damage which would otherwise occur if the pressure differential between the inside and the outside of the containers became excessive.

Cooling water is then admitted through the spray nozzles 26 in the top of the housing to cool the contents of the containers as rapidly as feasible in completing the processing cycle. The sprays of cooling water quickly condense the steam within the housing and if it were not for the air admitted from the accumulator 129 a vacuum would be created and the cans would burst since they remain hot and their internal pressures would remain substantially unchanged for the moment.

As the cooling proceeds, the air supply may be cut off by closing the air valve 127, the air then being gradually released through the open bleeder valve 101 to reduce the pressure on the exterior of the containers as the internal pressure drops so that the external pressure at all times corresponds approximately to the decreasing internal pressure of the cooling cans.

The cooling water is admitted from a supply source of adequate capacity through a pipe 131 under the control of a manually operated valve 132 that admits the water to a distributor pipe 133. As best indicated in Fig. 2, the pipe 133 divides into two branches 134 and 135 running along the top of the housing 21 at the respective sides of its longitudinal mid-plane. From the branch pipes 134 and 135, short connecting tubes 136 lead to each of the several spray nozzles 26 arranged in spaced relationship in the top of the housing 21. A suitable pressure gauge 137 is connected with the pipe 134 to indicate the pressure of the water supplied to the nozzles.

Since the containers at the ends of the reel 31 receive less water from the spray nozzles 26 in the top of the housing than do the containers in the mid-portion of the reel, a compensating auxiliary spray nozzle is provided in each end of the housing. As shown in Fig. 1, a nozzle 140 is mounted in the head 22 of the housing in position to spray additional water on the containers C in the inner end of the reel 31 as they rotate past the nozzle position. Similarly, an auxiliary nozzle 141 is provided in the hinged door 23 and is arranged at an angle to direct a spray of water past the basket retaining ring 59 and onto the containers C in the outer end of the reel. The auxiliary spray nozzles are preferably arranged for adjustment by means such as an adjusting valve 142 associated with the nozzle 141 whereby the amount of water sprayed on the end cans may be regulated to cool them at the same rate that the cooling of other cans on the reel is effected. The control valve 142 is mounted in a pipe 143 that conducts water to the nozzle 141 from a vertical pipe 144 that constitutes a vertical extension of the pivot axis of the door hinge 81, the pipe 143 swinging with the door 23 when it is opened and closed. The cooling water is supplied to the vertical pipe 144 through a rotary connecting joint 145 that is connected by an elbow and a pipe 146 to the branch supply pipe 135 whereby water is provided to the auxiliary nozzle 141 through connections which permit swinging of the door 23.

If desired, the cooling water may be sprayed on the containers from the inside of the reel 31 by nozzles supplied by fixed pipes extending through the dished head 22 and the door 23 toward the central wheel structure or by a pipe extending through the hollow drive shaft 33.

The cooling water that is sprayed on the containers in the reel 31 gravitates to the bottom of the housing 21 and drains through the holes 25 in the bottom of the housing shell into the header 24. A drain pipe 148 leads from the bottom of the header 24 into a float operated drain valve or trap 149 which permits the spent cooling water to flow into a drain pipe 150 but prevents the escape of air under pressure retained in the chamber for counterbalancing the pressure within the containers. A bleeding valve 151 is provided in the top of the trap 149 for releasing air trapped in the float chamber. A second pipe 152 leading from the header 24 is provided with a manually operated valve 153 that may be opened to provide a direct connection from the header to the drain pipe 150 whereby the water may be drained directly without passing through the trap 149 in the event that the volume of cooling water exceeds the capacity of the trap. A water gauge or sight glass 154 is mounted in well-known manner on the side of the housing to indicate any undesirable accumulation of water in the bottom of the housing.

As a guide to the proper operation of the sterilizing process, it is desirable to ascertain the actual temperature of the material within one or two typical containers on the reel during the entire processing cycle of heating and cooling. For this purpose selected containers are each provided with a thermocouple temperature sensitive element 155. The elements 155 in the containers are connected by flexible detachable leads 156 to a junction box 157 carried on the outer end of a hollow shaft extension 158 that is secured to and extends axially from the inner end of the hollow reel shaft 33. The hollow shaft extension 158 and the hollow shaft 33 accommodate thermocouple leads 159 that extend therethrough from the junction box 157 to a slip ring unit 161 mounted externally on the exposed end of the shaft 33 shown at the left in Fig. 1. The slip rings 161 are engaged by electrical brush collector elements 162 which are connected by a conductor cable 163 with a temperature indicating and recording instrument 164 that is mounted on the control panel 109 beside the pressure responsive instrument 108. The instrument 164 is arranged in a well-known manner to respond to the stimulus of the one or the other of the thermocouples 155 selectively. By observing the instrument 164, the operator can regulate the pressure within the housing 21 to correspond with the internal container pressure as indicated by the temperature within the containers sensed by the thermocouples 155. Furthermore, the instrument 164 maintains a record of the temperature changes within the container that provides exact information for establishing the precise time required to effect sterilization with minimum deleterious effect on the quality of the material being processed. Also the sterilization process can be checked from these records for variations in effectiveness from time to time.

The speed at which the reel 31 is rotating during the processing of the material in the containers C may be ascertained by means of a suitable tachometer or by simply counting the revolutions of the shaft 33 or the sprocket 40. In accordance with the previously mentioned Clifcorn et al. patent, it is known to be difficult to heat the portions of food products at the center of a can since they are at the greatest distance from the surface to which heat is applied and it is therefore recommended that the cans be rotated end-over-end at a speed which will cause the head space bubble to cross through the center of each can thereby displacing the material at the center and causing it to move toward the can walls. With non-viscous liquid material the movement of the head space bubble through the center of the can effects a stirring action which agitates all parts of the contents.

However, it has been found that some materials, particularly foodstuffs including solid particles, have a tendency to resist the stirring action of the head space bubble especially in the outer ends of the cans where centrifugal force has its greatest effect. As the cans of such material pass through the highest point in the circle of rotation, centrifugal force acting on the material particles in the upper or outer end of the can causes them to be held against the end of the can and prevents stirring movement. In accordance with one aspect of the present invention, it has been found that by rotating the cans end-over-end at a speed just below that at which centrifugal force overcomes the action of gravity in the outer end of the cans at the top of the circle of rotation, the material can be caused to move inwardly relative to the can end in effecting a stirring action. In practice it has been found that by rotating the cans at approximately 95 percent of the speed at which centrifugal force on the material would exactly balance the force of gravity, the material at the outer end of the can will be reciprocated away from the end of the can by the action of gravity when the can is at the top of its circle of rotation.

In other words, the maximum speed should be such that the centrifugal force acting on any particle within the can, particularly those particles at the outer end of the can at the greatest velocity and radius, is 95 percent of the weight of the particles. At this speed the head space bubble travels around the inside perimeter of the can with all the material in the can dropping toward the inner end of the can at the top of its rotation and dropping toward the outer end of the can at the bottom of the rotation, due to the force of gravity being greater than the centrifugal force. With non-viscous liquid material this endwise oscillation of the product in the container easily takes place within the time for one-half revolution of the reel. However, some materials, particularly foodstuffs of a viscous nature or others which resist the free-flowing stirring action of the head space bubble, require more time to flow from end to end of the can. In this case the required longer time is provided by reducing the rotational speed below that described so that a longer time is provided in the half revolution required for this oscillation. The correct speed is determined by using several thermocouples at various radial locations, particularly just inside the outer outer end to determine whether or not uniform temperature distribution exists throughout the material in all portions of the can and that the rate of temperature rise is as rapid as possible.

As a specific example, with the outer end of the can rotating at a radius of 15¾ inches, the speed of rotation at which the centrifugal force will balance the force of gravity at the upper position is 47.3 revolutions per minuate. Accordingly, if the can is rotated at 45 revolutions per minute, for example, the force of gravity will overcome centrifugal force and will operate to reciprocate and effect stirring movement of the material in the outer end of the can as described.

As previously indicated, the agitating sterilizer herein set forth is particularly well adapted to sterilize cans of difficult-to-process food products such as heat sensitive material of a viscous nature which tends to become overcooked in the vicinity of the can walls before the interior portion can be heated to the required sterilizing temperature when processed in the usual previously accepted manner. This problem of over-cooking is accentuated when the material being processed is packed in cans of large size for institutional use and the like, as some materials adapted for canning in small size cans are subject to injurious overheating when processed in large cans by previous methods. Through the use of the apparatus disclosed herein the time necessary to heat and cool such materials is decreased to the extent that the material can be properly processed in large cans expeditiously and without injury to the quality of the product. As a specific example of a difficult product which the present apparatus is particularly well adapted to process, whole kernel corn, brine packed in No. 10 cans may be considered as typical.

In processing this material, the sealed large cans of the uncooked corn are loaded into baskets 32 of appropriate size which are then slid into the basket slots 54 of the reel 31 to fill the periphery of the reel with cans disposed with their axes radially of the axis of rotation of the reel. The moveable door 23 is then closed and clamped upon the sealing gasket 82 by operation of the clamping ring 84 with the aid of the lever 90. Rotation of the reel is then effected by starting the driving motor 36, the driving speed being adjusted to effect the desired reciprocating stirring movement of the material as previously explained.

The machine operator then adjusts the pressure responsive instrument 108 by turning the adjusting knob 113 to set its control point initially at the position for establishing and maintaining pressure of about three pounds to the square inch in the housing 21. Steam is then admitted into the housing from the steam line 97 and through the pressure regulating valve 107 by opening the steam selector valve 96, the vent valve 100 and the bleeder valve 101 being open to permit the escape of air as the steam enters. As soon as most of the air is exhausted and the temperature of the steam within the housing reaches the neighborhood of 195° F. as indicated by the thermometer 102 or the temperature responsive instrument 120, which usually occurs in about forty five seconds, the large vent valve 100 may be closed with the assurance that the residual air within the housing 21 will escape through the bleeder valve 101 which remains open. The pressure within the housing then rises to three pounds under control of the pressure regulating valve 107 with the temperature increasing correspondingly.

The operator then observes the temperature of the material being processed by watching the temperature indicating instrument 164 connected with the thermocouple 155 in a can on the reel, the temperature of the corn being about 140° F. when loaded into the machine. As the temperature of the material increases, he gradually increases the steam pressure within the housing by adjusting the control point of the pressure controller 108 through turning the adjusting knob 113, the controller operating automatically upon the pressure regulating valve 107 to maintain the pressure in accordance with the adjustment of its control point. By referring to a conversion table or to a calibrated pressure scale on the temperature indicating instrument 164, the operator is enabled to maintain the pressure within the retort housing 21 substantially equal to the pressure within the several containers being processed as the container pressure builds up through absorbing heat from the steam. This procedure avoids the possibility of increasing the steam pressure too rapidly which might otherwise result in an excessive pressure differential between the interior and the exterior of the cans C that might result in causing them to leak or in collapsing them if the full steam pressure were applied suddenly. This gradual increase in steam pressure is particularly important in processing material of a viscous nature which is difficult to stir and is therefore slow to heat. However, in processing watery material on the other hand, it may not be necessary that the changes in the controller set point be made gradually since the material heats rapidly and the internal can pressure increases as rapidly as the pressure within the housing can be built up by the inflowing steam. Under these circumstances the controller set point may be turned up to the maximum pressure position at once and the steam admitted as fast as it can flow through the pipes and valves.

After the pressure responsive instrument 108 has been adjusted by turning its knob 113 to establish its control point at the maximum pressure of about 21 pounds per square inch corresponding to the processing temperature of about 260° F. to be maintained within the housing 21, the operator checks the temperature by observing the thermometer 102. When the sterilizing temperature is established, the operator then starts a timer or observes a clock for the purpose of maintaining this processing temperature for a length of time that has been predetermined as proper to effect sterility. During the processing time the operator observes the thermometer 102 and the temperature recording instrument 120 to be sure that the temperature in the retort remains at the predetermined sterilizing temperature.

The proper time interval for subjecting the material to the predetermined processing temperature differs with different materials. In the case of the brine packed whole kernel corn previously referred to, the time required to bring the contents of the containers up to a sterilizing temperature of 260° is about six and one-half minutes and this sterilizing temperature is then maintained for a period of about two and one-half minutes. To achieve this processing time, the retort is brought up to the full pressure of 21 pounds in about four minutes and this pressure is then held constant for about five minutes, the containers being at full temperature for the last two and one-half minutes of the nine minute heating period.

At the end of this predetermined sterilizing time period the supply of steam is shut off by manually closing the steam selector valve 96, and to maintain the pressure within the retort, the air selector valve 127 is opened to admit air from the accumulator 129 through the pressure regulating valve 107 as may be required to replace the steam as it condenses. Cooling water is then admitted to the spray nozzles by manually opening the water supply valve 132 to condense the steam and cool the cans of material as rapidly as possible. The spray of cooling water condenses all of the steam in about fifteen seconds, the pressure being maintained constant on the exterior of the cans by the air which flows in to replace the steam.

When the material in the cans begins to cool under the influence of the cooling water sprays, as indicated on the can temperature indicating instrument 164, the operator may adjust the control point of the pressure control instrument 108 downwardly in accordance with changes in temperature of the material in the cans, to gradually lower the retort pressure, opening the main vent valve 100 intermittently as necessary to supplement the pressure reducing effect of the open bleeder valve 101. In this manner the pressure within the retort is maintained in balance with the pressure within the cans during the cooling period to avoid damaging pressure differentials. As the temperature of the product is reduced to the region of 175° the retort approaches atmospheric pressure, whereupon the air selector valve 127 may be closed to shut off the supply of air under pressure and the main vent valve 100 may be opened fully.

The cooling water continues to impinge on the revolving containers and drains away through the float operated valve 149 and through the drain valve 153 which may be opened manually after the first minute or so of cooling to increase the rate of draining and prevent the accumulation of water in the housing 21. When the temperature of the material in the cans has been reduced to the neighborhood of 100° F. as indicated by the temperature indicating instrument 164, which occurs after about five minutes of cooling, the supply valve 132 is closed to shut off the water sprays and rotation of the reel is stopped by de-energizing the driving motor 36, the residual heat in the cans being sufficient to dry them to prevent rusting.

The retort door 23 is then released by unlocking the retaining ring 84 and the door is swung open in order that the baskets 32 of processed containers may be removed. This is best accomplished by withdrawing the baskets successively as each is turned to the lowest position on the reel as shown in Fig. 2. At the same time, another set of baskets 32 which have been loaded with containers of untreated material are slid into the reel slots to replace the processed ones, whereupon the door 32 is closed and sealed and the processing cycle repeated. By observing the material temperature indicating instrument 164 during each processing cycle the operator can ascertain whether or not the material is following the prescribed rate of temperature changes and in the event he detects any deviation he may make compensating adjustments of the length of the processing time for example, to insure that complete sterility is effected in each batch of material being processed.

By way of comparison, when brine packed whole kernel corn in No. 10 cans is processed at 250° F. by the usual still cooking method it requires about forty-two minutes heating time as against about nine minutes when processed with the apparatus set forth herein. Furthermore, a long cooling period is required in addition when the material is cooled without agitation. The total time required for this process using the improved apparatus set forth herein, that is the time from the starting of the driving motor 36 until the motor is stopped at the end of the cooling period is approximately thirteen and one-half minutes.

According to a modified form of the present invention, the various steps of this process may be effected automatically thereby relieving the machine operator of the necessity of making the several adjustments at the prescribed times. To this end, the sterilizing apparatus is provided with an automatic control system which is illustrated diagrammatically in Fig. 6 of the drawing.

As shown in the drawing, electrical energy for operating and controlling the apparatus is derived from a power source that is indicated by three phase line conductors L1, L2 and L3 that may be disconnected from a suitable power supply by opening a disconnect switch 168, the usual protective circuit breakers or fuses (not shown) being provided in conjunction with the disconnect switch.

One feature of the automatic control system involves an interlocking switch 170 mounted on the door locking ring 84 and cooperating with a lug on the door 23 in such a manner that when the door locking ring 84 is in unlocked position to permit the door to be opened, or when the door 23 is swung open even though the ring 84 may be turned to locked position, normal operation is prevented but contacts 171 of the switch are closed to constitute a jogging circuit whereby the reel driving motor 36 may be energized momentarily to turn the reel 31 for positioning its basket trackways 54 to receive the baskets 32 of cans to be processed. With the disconnect switch 168 closed to energize the line conductors, the jogging action is effected by pressing a jogging push button switch 172 thereby closing its contacts 173 that completes a circuit from the main line conductor L2 through a conductor 174, the closed contacts 171 of the interlock switch 170, a conductor 175, the closed contacts 173 of the jog switch 172 and a conductor 176 leading to a coil 177 of a motor starting switch 178 and thence through a conductor 179 to a return conductor 180 connected with the line conductor L1. Energizing coil 177 in this manner closes motor starter switch 178 to connect line conductors L1, L2 and L3 to conductors 181, 182 and 183 respectively thereby energizing the motor 36 to effect momentary rotation or jogging of the reel 31 as required for positioning the trackways 54. Releasing the jogging button 172 de-energizes the coil 177 and opens the switch 178 to stop the motor 36.

After the baskets are loaded in the reel slots or trackways 54, the door 23 is closed and the locking ring 84 turned to locking position as previously explained. This turning movement of the locking ring actuates the interlocking switch 170 to open the contacts 171 thereby opening the jogging circuit and rendering the jogging switch 172 inoperative. At the same time another set of contacts 184 in the switch 170 are closed by locking movement of the locking ring to establish a control circuit for effecting continuous operation of the motor 36 during processing of the containers. This motor starting circuit extends from the line conductor L2 through the conductor 174, the closed contacts 184 of the interlock switch 170, and a conductor 185 leading to an air pressure responsive switch 186 the contacts of which are arranged to be closed when suitable pressure exists in the accumulator 129, a conduit 187 being provided to transmit air under pressure from the accumulator 129 to the switch 186. From the pressure responsive switch 186 a conductor 188 leads to normally open contacts 189 of a starting push button switch 190. When it is desired to start operation of the apparatus, the push button switch 190 is pressed to close the contacts 189 thereby completing the starting circuit through a conductor 191 to normally closed contacts 192 of the jog switch 172 from which the conductor 176 leads to the coil 177 of the motor starting switch 178, the control circuit being completed through the conductor 179 and the return conductor 180 to the line conductor L1.

When the motor starting switch 178 is thus closed by momentarily depressing the starting switch button 190 it also closes holding contacts 193 to establish a holding circuit for maintaining the switch 178 closed after the starting push button switch 190 is released. This holding circuit extends from the line conductor L2 through the conductor 174, the closed contacts 184 of the door interlock switch 170 and conductor 185 to a conductor 194 that leads to a drain water temperature responsive switch 195. The switch 195 is actuated by a temperature responsive bulb 196 in the drain pipe 150 and is arranged to open the circuit for stopping the machine at the end of the process cycle when the temperature of the drain water has dropped to a point indicating that the can cooling process has been completed. During running, the contacts of the switch 195 are closed to complete the circuit through a conductor 197 to the closed holding contacts 193 of the motor switch 178 and thence through a conductor 198 to a normally closed stop push button switch 199 that completes the holding circuit to the conductor 191 which is connected by the normally closed contacts 192 of the jog switch 172 to conductor 176 leading to the switch coil 177 and returning through conductor 179 and return conductor 180 to the line conductor L1.

Since the drain water temperature switch 195 may not warm up in time to close for the restarting of the machine after stopping it at the end of a cycle, this switch is shunted by contacts 201 of a water pressure responsive switch 202 which completes a shunt circuit from the conductor 194 through a conductor 203 and the closed contacts 201 to a conductor 204 leading to the conductor 197, thereby bridging the temperature responsive switch 195. The pressure responsive switch 202 is connected to the cooling water supply pipe 133 and its contacts 201 remain closed until the full cooling water pressure is turned on, the water pressure being off and the switch closed when the apparatus is being started. During heating of the retort, the temperature responsive bulb 196 is heated and closes the process terminating switch 195 in parallel with the shunt contacts 201. When the cooling water is then turned on to cool the containers at the end of the process, the water pressure in the pipe 133 opens contacts 201 of the pressure responsive switch 202 thereby opening the shunt circuit and conditioning the apparatus to be stopped by operation of the temperature responsive switch 195 when it is opened at the end of the cycle. Alternatively, the holding circuit may be opened to stop the apparatus at anytime by opening the manually operated stop switch 199, which is ordinarily used only in emergencies.

As previously explained in regard to the manual operation of the process, as soon as the motor 36 is started and the reel 31 is rotating, steam for sterilizing the material in the containers is admitted to the retort 21 from the steam accumulator 98 through the pressure regulating valve 107 under control of the pressure regulating control instrument 108. In this modification of the invention, the flow of the steam into the retort is initiated by admitting air under pressure to a pneumatic control system including the actuator of the pressure regulating valve 107. As indicated in the drawing, air under pressure for the control system is derived from the accumulator 129 through the conduit 187 from which a pressure regulating valve 206 admits air at a constant pressure of about twenty pounds to the square inch into a conduit 207 leading to an electrically operated air supply valve 208 that is normally closed when the machine is not operating.

When the starting push button switch 190 is closed to start the cycle, its starting contacts 189 in closing establish a circuit from the conductor 188, which is energized from the line conductor L2 as previously explained, through the contacts 189 and a conductor 209 leading to an actuating coil 210 of the valve 208 from which a conductor 211 connects with the return conductor 180 that leads to the line conductor L1. After the holding circuit is established the conductor 209 is energized directly from the conductor 191 and the actuating coil 210 of the valve 208 therefore remains energized and the valve stays open.

When the coil 210 is energized in this manner and the air supply valve 208 is thus opened the air flows into and through a supply conduit 215 to an electrically operated selector valve 216 which is then de-energized and positioned to establish connection with a conduit 217 leading to an air-stream selector valve 218. The valve 218 is likewise de-energized and is positioned to effect a direct connection through a conduit 219 to the steam pressure regulating valve 107, the arrangement being such that the full pressure of the control air is applied to move the valve 107 to full open position for admitting steam at maximum rate to fill the retort and start the heating action as quickly as possible after the cycle is started.

The vent header 99 is in this instance provided with a pneumatically operated vent valve 220, which is normally open and requires air pressure to close, this valve being fully open at the start to provide maximum venting of air from the retort as the steam enters through the header 24. The vent valve 220 is connected by a control conduit 221 to and controlled by an electrically operated valve 222 that is de-energized at this time and closed to prevent the entry of pressure fluid into the conduit 221 while maintaining a connection between the conduit 221 and the atmosphere, thus leaving vent valve 220 open.

As previously mentioned, in about forty five seconds substantially all of the air is vented from the housing 21 and the steam therein reaches a temperature of about 195° F. When this occurs a temperature responsive bulb 226 in the dished head 22 of the housing 21 operates to close the contacts of a temperature responsive switch 227. The switch 227 closes a circuit which leads from the energized conductor 209 through a conductor 228, the closed switch 227, a conductor 229 and a conductor 230 to an actuating coil 231 of the electrically operated valve 222, a conductor 232 connecting the coil 231 to the return conductor 180. When the coil 231 is energized it operates the valve 222 to close the connection between conduit 221 and the atmosphere and to connect the conduit 221 instead to the regulating air conduit 112 leading from the pressure responsive instrument 108. This provides for admitting air to close the vent valve 220 under the control of the instrument 108, the arrangement being such that the vent valve is not opened again unless the pressure within the housing 21 exceeds the pressure setting of the instrument 108.

Closing of the temperature responsive switch 227 likewise energizes a coil 234 of the selector valve 216, the current flowing from the switch 227 through the conductor 229 and a conductor 235 to the coil 234 and thence through a conductor 236 to the return conductor 180. Energizing of coil 234 causes the valve 216 to close off the direct connection from the pressure supply line 215 to the steam valve 107 and to effect a connection from the control conduit 112 from the instrument 108 to the conduit 217 which establishes a connection through the selector valve 218 and the conduit 219 to the steam controlling pressure regulating valve 107 thereby placing the steam pressure under the control of the pressure responsive instrument 108 to admit steam when the pressure in housing 21 is less than the setting of the instrument 108.

As previously explained, the pressure setting or set point of the instrument 108 may be adjusted manually by turning the control knob 113 which may be turned gradually by the operator to increase the pressure within the retort at a more or less constant rate. However, in the present version of the apparatus the pressure control point is adjusted automatically to effect increase in the pressure at a predetermined rate of change.

As shown in Fig. 6, the shaft of the control knob 113 is provided with a small pinion 238 that meshes with complementary teeth on a gear sector 239 that is pivotally mounted in and constitutes part of the instrument 108 and is normally actuated by turning the knob 113. Automatic operation according to the invention is achieved by means of a piston rod 240 that is pivotally connected to the gear sector 239 and that carries a piston 241 operating in a pneumatic cylinder 242. Thus by admitting air under pressure to the one or the other end of the cylinder 242 to move the piston 241 the pressure setting or control point of the instrument 108 may be raised or lowered at a rate depending upon the rate at which the air is admitted.

The control circuit for the adjustment of the pressure regulating instrument 108 includes a timer mechanism 245 that is arranged to be set automatically to "zero time" position when the apparatus is started. This is accomplished by means of a second set of contacts 246 on the starting switch 190 the arrangement being such that when the switch is closed to start the motor 36 the second contacts 246 establish a circuit which leads from the conductor 191 that is energized through closing the start contacts 189 thence through a conductor 247, a normally closed timer selector switch 248 and the contacts 246 to a conductor 249 that leads to a terminal 250 on the timer 245. When the terminal 250 of the timer is energized, the timer is returned to zero position and in doing so actuates an internal switch 251 to a position in which it connects an energized line 252 that leads from the timer selector switch 248 to a timer terminal 253. This establishes a holding circuit which retains the timer in zero position, the circuit extending from the terminal 253 through a conductor 254 and a conductor 255 to a temperature responsive switch 256. The switch 256 is closed and effects connection through a conductor 257 to the conductor 249 leading to the timer terminal 250, thence through the timer apparatus to a return terminal 258 connected by a conductor 259 to the return conductor 180, the arrangement being such that the timer will be held in zero position so long as the switch 256 remains closed.

The conductor 254 leading from the energized terminal 253 of the timer 245 also furnishes energizing current to a coil 260 of an electrically operated valve 261, the circuit returning through a conductor 262 to the return conductor 180. When the coil 260 is thus energized, it opens the valve 261 to admit air under pressure from the supply conduit 215 through an adjustable throttling control valve 264 into a conduit 265 leading to the left end of the cylinder 242 as shown. The air flowing into the cylinder 242 at the rate established by the setting of the throttle valve 264 causes the piston 241 to move to the right (the right end of cylinder 242 being connected to atmosphere) and thereby moves the pressure set point of the instrument 108 in a manner to increase the pressure setting at a predetermined rate adapted to the heating characteristics of the material being processed, as indicated by the rate of change in the can temperature shown by the instrument 164. As previously mentioned, in the case of whole kernel corn the processing temperature is about 260° F. which corresponds to a steam pressure of about twenty one pounds to the square inch. The final processing pressure is established in this apparatus by an adjusting screw 266 threaded into the right end of the cylinder 242 and that is arranged to engage the piston 241 and prevent its further movement to the right when it has turned the adjusting knob 113 to the position at which the pressure set point is established at about twenty one pounds, in this instance. The rate at which the change in pressure is effected is established by adjustment of the throttle valve 264 and in this case, the adjustment is such that as previously explained, about four minutes is required to bring the retort temperature up to the sterilizing temperature of whole kernel corn.

When the temperature of the steam within the retort reaches a temperature about two degrees below the predetermined sterilizing temperature of 260° F., a temperature responsive bulb 270 in the dished head 22 of the retort operates to open the previously mentioned temperature responsive switch 256. This breaks the timer holding circuit and de-energizes timer terminal 250 thereby permitting the timer 245 to start operating. For the processing of whole kernel corn as previously mentioned, the timer 245 is set to maintain the sterilizing steam pressure under control of the instrument 108 for a period of about five minutes, other appropriate settings being used for other products.

Should the electric power fail during the timing period, the main holding circuit through holding contacts 193 will open and the timer will stop at the elapsed time position, the entire apparatus being de-energized thereby necessitating restarting by means of the starting button 190. In this event the operator first opens the timer selector switch 248 to prevent the timer being reset to zero when the start button is actuated, the timing of the process then being resumed from the point of interruption by closing the switch after the apparatus is restarted. Furthermore, in the event it becomes desirable to lengthen the timing period during operation for any reason, the switch 248 may be opened to stop the timer for the additional time interval required and then closed again to resume the timer operation for completing the holding period.

At the end of the pre-established processing time, the timer actuates its internal switch 251 to de-energize its terminal 253 and energize an adjacent terminal 271. De-energizing terminal 253 opens the circuit to the temperature responsive switch 256 thereby preventing restarting of the timer when this switch closes the holding circuit during the cooling phase of the cycle. Likewise this de-energizes conductor 254 and the actuating coil 260 of the valve 261 thereby shutting off the supply of air to the left end of the cylinder 242 and opening that end of the cylinder to the atmosphere.

Energizing terminal 271 of the timer 245 establishes a circuit which leads through a conductor 272 to actuating coil 273 of the air-steam selector valve 218, a return conductor 274 leading from the coil to the return line 180. Energizing coil 273 of valve 218 causes the valve to close the connection to conduit 219 leading to the steam pressure regulating valve 107 the air trapped in the valve leaking out through clearances or bleed openings whereupon the valve then closes to cut off the supply of steam to the retort. At the same time valve 218 opens a connection to a conduit 276 leading to an air supply valve 277 which then operates under the control of pressure responsive instrument 108 to admit air from the accumulator 129 through pipe 128 into the retort 21 for maintaining pressure on the exterior of the containers in the reel by replacing the steam in the retort as it condenses.

Energization of timer terminal 271 and conductor 272 also establishes a circuit through conductor 279 to a coil 280 of a control valve 281, a conductor 282 completing the circuit to the return conductor 180. When the coil 280 is thus energized, the valve 281 is opened to admit pressure from the air pressure line 215 through a branch conduit 285 into a conduit 286 leading to a cooling water control valve 287, the pressure operating to open the valve for admitting cooling water from the pipe 131 into the pipe 133 and the various spray nozzles that are supplied from this pipe to spray cooling water onto the containers in the reel. As previously explained, the sprays of cooling water projected into the retort condense all of the steam in about fifteen seconds, the pressure being maintained by the replacement air flowing in through the valve 277. The spent cooling water after flowing over the containers drains away through the header 24 and the float operated drain control valve 149 that permits the water to flow into the drain pipe 150 while preventing the escape of the steam or air under pressure within the retort.

The pressure of the water when admitted to the pipe 133 actuates the pressure responsive switch 202 to open the shunt contacts 201 for conditioning the drain water temperature switch 195 to stop the machine at the end of the cooling phase as previously mentioned. At the same time, movement of the switch 202 closes shunt contacts 288 thereby establishing a shunt circuit around the vent closing temperature responsive switch 227. This serves to maintain the coil 234 of the selector valve 216 and the coil 231 of the vent valve 220 energized after the switch 227 opens during cooling, whereby the admission and release of air remains under the control of the pressure regulating instrument 108 until the end of the cycle.

The water pressure switch 202 also operates to close contacts 289 which establishes a circuit from the energized terminal 271 of the timer 245 through conductor 272, the contacts 289 and a conductor 290 that leads to a coil 291 of an air valve 292, the circuit returning through a conductor 293 and the return conductor 180. When the coil 291 is energized, it operates the valve 292 to admit air from the control line 215 through an adjustable throttle valve 294 into a conduit 295 leading to the right end of the cylinder 242. This effects movement of the piston 241 to the left thereby moving the set point or pressure setting of the instrument 108 in downward direction at a rate established by the adjustment of the throttle valve 294 to effect a reduction in the air pressure within the retort 21 at a predetermined rate for maintaining a balance between the external pressure in the retort and the internal pressure within the containers as they are cooled by application of the cooling water spray.

As previously mentioned, the air control valve 277 is now under the control of the instrument 108 to admit air for maintaining the pressure in the retort. Likewise the vent valve 220 is also controlled by the instrument 108 in such a manner that as the instrument's set point is moved downward air will be vented through the valve 220 from the retort as necessary to effect the desired reduction in pressure. In the event that there should be no water pressure in the pipe 131 or if the pressure should fail during the cooling operation, the pressure responsive switch 202 will open the contact 289 thereby de-energizing coil 291 of air valve 292 to close it and prevent further downward adjustment of the pressure set point in the instrument 108. This will maintain the pressure on the exterior of the containers substantially constant to balance the internal pressure until cooling water can be supplied to reduce the temperature of the containers. In the meantime, the pressure responsive instrument 108 may be adjusted manually if necessary to balance the pressures by operating the control knob 113, since both ends of the cylinder 242 are open to the atmosphere when the coils of the air valves 261 and 292 are de-energized.

As the cooling proceeds, the air in the retort is vented progressively through the vent valve 220 until the pressure therein is reduced substantially to atmospheric pressure whereupon the vent valve remains open, the temperature of the containers being then about 175° F. As the cooling of the containers continues, the temperature of the spent cooling water flowing out through the drain 150 continues to drop until the temperature responsive switch 195 is actuated to terminate the cycle. This occurs at the end of about five minutes after the cooling water was turned on. It has been found that when the containers have been cooled to a temperature of approximately 100° the cooling water temperature will be about 73° and consequently the temperature responsive bulb 196 of the switch 195 has been selected to operate at that temperature.

When the temperature responsive switch 195 opens, the motor starting coil 177 is de-energized thereby opening the motor switch 178 and the holding contacts 193 and de-energizing the entire electrical system to shut down the machine. This causes the control air supply valve 208 to be de-energized and closed and likewise de-energizes the water control valve 281 to close the water valve 287 to shut off the cooling water thus terminating the cycle. When the cooling water pressure is shut off, the pressure responsive switch 202 closes the shunt contact 201 to bridge the open temperature responsive switch 195 to condition the system for starting the next cycle when the push button 190 is closed regardless of whether or not the water temperature bulb 196 has cooled sufficiently to close the temperature responsive switch 195. Likewise the air-steam selector valve 218 upon being de-energized connects the pneumatic control system to the steam regulating valve 107 which remains closed and also closes the air regulating valve 277. The timer 245 remains at the "end of time" position to indicate that the proper sterilizing time has elapsed and is not reset to zero until the machine is again started by closing the starting switch 190.

The door locking ring 84 may then be turned to unlocked position and the door 23 opened to remove the cans which are at the proper temperature to effect drying by residual heat for preventing rusting. When the locking ring 84 is turned to unlocked position, it moves the interlocking switch 170 to open the contacts 184 thereby rendering the starting switch 190 inoperative and preventing the apparatus from being started with the door unlocked or open. At the same time the jog contacts 171 of the switch 170 are closed to complete the circuit to the contact 173 of the jog button 172 whereby the motor 36 may be energized momentarily by pressing the button 172 for turning the reel 31 to position the can basket for convenient removal. The reel may then be reloaded with baskets of new cans and the door closed and locked by the locking ring 84. Turning the ring 84 to locking position with the door closed again closes the contacts 184 of the interlocking switch 170 to render the starting switch 190 operative to restart the cycle as previously explained.

Suitable pilot lights or other indicating means may be provided in connection with the various elements of the circuit to indicate to the operator the positions of the various valves and switches in order that any difficulty which may develop during operation may be detected promptly. In the event of trouble, the stop button 199 may be actuated by the operator to stop the machine at any time, as previously explained.

Instead of controlling the motor starting circuit directly by the automatic control system, it may be preferable in some instances to provide the motor 36 with an electrically controlled clutch and brake apparatus. In that event the circuit to the coil 177 of the motor starting switch 178 would be connected to effect operation of the clutch and brake system.

In the operation of the apparatus either by manual control or under timed automatic control as previously explained, the temperature of the material being processed rises to the temperature of the heating steam during the timed sterilizing or holding period of the processing cycle. Thus while the sterilizing temperature within the retort is being held constant at say 260°, the pressure within the containers of food being processed rises to a value substantially higher than the pressure of the heating steam in the retort by reason of the fact that each container encloses a small quantity of air in its head space, as previously explained. According to another modification of the invention, this situation of unbalance is avoided and further benefits obtained by automatically maintaining the pressure of the steam in the retort substantially equal to the pressure within the containers being processed. By this arrangement the steam pressure and likewise the sterilizing temperature may be permitted to increase well above the twenty one pounds pressure and 260° temperature previously mentioned, to maintain the pressure equilibrium on the containers throughout the entire heating phase. This results in a greater temperature difference between the heating steam and the material being heated particularly in the latter portion of the heating phase and consequently effects more rapid heat transfer, whereby the material being processed may be brought to a high temperature in a shorter period of time.

By rapidly increasing the temperature of the material in this manner, the time required to effect sterilization may be greatly shortened and this in turn makes it feasible to utilize higher temperatures since the material is subjected to the high temperature for so short a time that deleterious effects are minimized. In most instances this permits sterilization to be effected without any holding period, the temperaure of the material being increased as rapidly as possible to a predetermined high maximum temperature and then immediately cooled from this temperature in a continuous cycle.

To this end the control of the heating and cooling operations is effected by this modification of the invention directly in accordance with the temperature of the material being processed through utilizing the container temperature responsive instrument 164 to adjust the set point of the pressure regulating instrument 108. By this arrangement, it is possible to operate without utilizing a timer to control the sterilizing time and without apparatus for establishing a predetermined rate of increase and decrease of retort pressure. With the retort pressure directly responsive to the temperature within the containers, pressure equilibrium is maintained under all conditions of steam or water pressure or other variables. Furthermore, the most rapid rate of heating or cooling is effected automatically and independently of changes in the operating conditions or changes in the characteristics of the material being processed. As a result, the sterilizing process is effected in the shortest possible time under the circumstances of each batch being processed thereby resulting in a finished product of improved quality.

Referring now to Fig. 7 which illustrates the modified direct operating system, it will be seen that the control apparatus is in general quite similar to that previously described in connection with Fig. 6. However, the timer of Fig. 6 has been dispensed with and the pneumatic apparatus for effecting timed adjustment of the pressure controlling instrument 108 has been replaced by a pneumatic system operated directly from the container temperature responsive instrument 164. This operating connection is effected by a pressure conduit 301 leading from the instrument 164 and serving to exert variable pneumatic pressure upon the left face of the piston 241 of the instrument 108 in order to urge it to the right against the resistance of a calibrated spring 302, the arrangement being such that pressure setting of the instrument 108 is adjusted upward or downward in accordance with the amount of pressure exerted through the conduit 301 in response to changes in the temperature of the material in the container.

As previously explained in connection with the apparatus shown in Fig. 6, while the baskets of cans containing food to be processed are being loaded into the slots 54 in the reel 31 within the retort 21, the reel is turned by actuating the jog switch 172 as required to position the slots for loading. After the reel is loaded and the door 23 closed and locked, the processing cycle is started by closing the starting switch 190 which energizes the reel driving motor 36 and the electro-pneumatic control system including the main holding circuit and the control conductor 228 as previously explained. As in the other system, when the apparatus is started the steam valve 107 is wide open to admit steam to the retort 21 as rapidly as possible and likewise the air vent valve 220 is wide open to permit the escape of air as it is displaced by the inflowing steam. When the steam temperature within the retort increases to approximately 195° F. which occurs in about forty five seconds the temperature responsive bulb 226 inside the head 22 of the retort closes the switch 227 to terminate the vent period. As previously explained, this energizes the coil 231 of the valve 222 which then operates to close the vent valve 220. Closing of the switch 227 likewise energizes the coil 234 of the valve 216 that operates to place the steam valve 107 under the control of the pressure regulating instrument 108.

As indicated diagrammatically in Fig. 7, the product temperature responsive instrument 164 is connected to operate a pressure controlling apparatus 303 that receives air under pressure from the accumulator tank 129 through a conduit 304 and a pressure reducing valve 305 and admits the air into the variable pressure conduit 301 at a pressure varying from zero to approximately twenty pounds in proportion to the temperature of the material within the container C in the retort as sensed by the thermocouple 155 therein acting upon the instrument 164. At the time that the vent valve 220 closes the temperature of the material within the container C is such that, acting through the thermocouple 155, the instrument 164 and the pressure regulator 303, it effects adjustment of the pressure controlling instrument 108 to a pressure setting of approximately two pounds to the square inch. Thereupon, the pressure regulating instrument 108 automatically takes over control of the steam valve 107 in a manner to establish the steam pressure within the retort at approximately two pounds, the arrangement being such that this external pressure susbtantially balances the pressure then existing within the container C. However, because of the air in the container C, the pressure of two pounds therein is attained at a temperature substantially lower than the temperature of the steam at the same pressure within the retort. At this pressure, the temperature of the steam may be in the order of 40° or more higher than that within the container and this differential causes heat to flow into the container at a rapid rate whereupon the temperature of the material in the container rises rapidly.

The increasing temperature of the material within the container C reacts continuously through the thermocouple 155 and the temperature responsive instrument 164 to increase the pressure setting of the pressure regulating instrument 108 in a manner to maintain the pressure of the steam within the retort in equilibrium with the pressure within the container. This also serves to increase the steam temperature and to maintain the temperature differential between the steam and the container contents substantially constant, thereby continuing the high rate of heat flow into the containers, the heat being distributed throughout the material therein at a rapid rate by reason of the agitation effected by the end-over-end rotation of the containers with the reel 31.

This rapid heating of the material within the containers continues at substantially the same rate until the material in each container is heated to a predetermined maximum sterilizing temperature at which time the instrument 164 closes a maximum temperature switch 307 that operates to stop the heating phase of the cycle and to immediately commence the cooling phase. When the switch 307 is closed it establishes a circuit from the conductor 229 that was energized by closing the switch 227, leading through a conductor 308, the closed switch 307 and a conductor 309 to a coil 310 of a relay 311 from which a conductor 312 leads to the return conductor 180. Energizing the coil 310 closes the relay 311 and establishes a holding circuit in parallel with the switch 307 that leads from the energized conductor 229 through a conductor 314 and closed holding contacts 315 of the relay 311 to the conductor 309 connected with the coil 310. When the relay 311 is thus held in closed position, the set of contacts 316 of the relay establishes a shunt circuit in parallel with the vent closing switch 227 to prevent unintentional reopening of the vent. This circuit extends from the conductor 228 through a branch conductor 317, the closed contacts 316 and the conductor 314 to the conductor 229. By this arrangement the conductor 229 is maintained energized after the vent switch 227 opens when the bulb 226 is cooled during the cooling phase of the process cycle.

A third set of contacts 320 on the relay 311 effects a connection similar to that effected by the timer 245 in the apparatus shown in Fig. 6 when it operates at the end of the timing period. This connection extends from the energized conductor 228 through branch conductor 317 and the closed contacts 320 of the relay 311 and a conductor 321 to the conductor 272. Energizing the conductor 272 effects energization of the coil 273 of the steam-air transfer valve 218 that shifts the control connection from the steam valve 107 to the air valve 277. Control air trapped in the steam valve 107 escapes through clearances or bleed openings, whereupon the steam valve moves to closed position. The air valve 277 then comes under the control of the pressure responsive instrument 108 to admit air from the accumulator 129 into the retort 21 at the pressure determined by the setting of the instrument 108 for balancing the pressure within the containers C as indicated by the temperature therein sensed by the thermocouple.

The closing of the relay 311 and energization of conductor 272 likewise energizes coil 280 of control valve 281 which operates to open the water valve 287 thereby admitting cooling water from the pipe 131 into the header 133 that connects with the various spray nozzles for spraying cooling water onto the containers rotating in the retort. As previously mentioned, the cooling water quickly condenses all of the steam in the retort, the air flowing in through the valve 277 then replacing the steam entirely for maintaining the external pressure on the containers.

As the cooling water impinges upon the cans rotating end-over-end in the retort, the temperature of the food being processed is reduced as rapidly as possible. The reduction in temperature of the food operates through the thermocouple 155 and the temperature responsive instrument 164 to operate the pressure regulating device 303 for reducing the air pressure in the control line 301 thereby permitting the spring 302 to move the piston 241 to the left to change the position of the set point of the pressure control instrument 108 in the downward direction. This results in opening the vent valve 220 which is also under control of the instrument 108 to permit the escape of air from the retort for maintaining the pressure within the retort in equilibrium with the decreasing pressure within the containers C as indicated by the change in temperature sensed by the thermocouple. The cooling water flowing on the bulb 226 results in opening the vent control switch 227 but the conductor 229 is maintained energized through the closed shunting contacts 316 of the relay 311 as previously mentioned.

In this modification of the control system the drain water temperature switch shown in Fig. 6 has been dispensed with and termination of the processing cycle is effected in direct response to the temperature of the material being processed. For this purpose the container temperature responsive instrument 164 is provided with a normally closed minimum temperature switch 325 that is arranged to be opened when the temperature of the material is cooled to a predetermined minimum thereby opening the main holding circuit and stopping the apparatus. By actuating the switch 325 directly in accordance with the temperature of the material being processed, termination of the processing cycle may be effected accurately at a desired temperature that may be of the order of 100° and is sufficiently high to insure complete drying of the containers when they are removed from the retort.

As shown in the drawing, the minimum temperature switch 325 is connected in the main holding circuit in series with the holding contacts 193 of the motor starting switch 178 by a conductor 326 leading from the contacts 193 to the switch 325 and a conductor 327 leading from the switch 325 to the closed contacts 184 of the door interlock switch 170. Thus when the minimum temperature switch 325 is opened the main holding circuit is opened thereby stopping the motor 36 and de-energizing the entire electrical control system. This results in closing the cooling water valve 287 to shut off the cooling water promptly with minimum consumption and in repositioning the various other control valves to condition them for starting the next cycle of operations. As previously mentioned, the stop switch 199 is available for opening the holding circuit to stop the apparatus at any time.

At the termination of the cycle the processed containers are removed from the retort and another batch of freshly filled containers are loaded into the reel 31. Preferably one of the freshly filled containers will be provided with a thermocouple 155 and a lead wire 156 that is plugged into the box 157 on the reel 31 as shown in Fig. 1. The temperature of the material in the freshly filled container will ordinarily be about 170°, considerably higher than the temperature at which the terminating switch 325 on the instrument 164 is opened. Consequently, the switch 325 will be closed by operation of the instrument 164 to condition the circuit for starting as soon as the new batch of containers is loaded and the door 23 closed. The processing cycle may then be repeated by starting the apparatus through closing the starting switch 190 as previously explained.

In processing cream style corn for example by means of the control system shown in Fig. 7, it has been found desirable to heat the corn as rapidly as feasible to a temperature of 269° F. This is accomplished in about eleven and one-half minutes after starting the cycle, the steam temperature being at that time 292° F. under forty five pounds per square inch pressure to balance the pressure within the containers being processed. By way of comparison, processing creamed style corn at a temperature of 260° F. requires about sixteen and one-half minutes for the heating phase for the same degree of sterility. As previously explained, the steam is turned off automatically and the cooling phase commenced immediately upon the temperature of the material reaching the predetermined maximum. The cooling action occurs in the manner previously described, the material being cooled in this instance from its maximum temperature to its terminal temperature in approximately eight minutes.

In processing a less viscous material such as whole milk for example, the heat transferring action is more rapid and the container contents may be heated to a maximum temperature of 275° in about two and one-fourth minutes with the steam temperature rising to about 290°. Cooling likewise takes place in the manner previously described, requiring in this case about four and one-half minutes, the entire cycle being completed in about six and three-quarter minutes. By this arrangement the sterilizing temperature achieved is so high that a very short time is sufficient to effect sterility since sterility is exponential with temperature, increasing ten times for each 18° increase in processing temperature; while the chemical rate of quality deterioration only doubles or triples each 18° and consequently the danger of reducing the quality of the product through long exposure to heat is greatly diminished.

Under some circumstances it may be desirable to operate the apparatus in such a manner that the pressure of the steam within the retort is maintained higher than the pressure within the containers being processed. Obviously this pressure difference must be limited to a predetermined amount not sufficiently great at any time to result in damage to the containers. In this manner the temperature differential may be increased somewhat and the rate of heating thereby still further increased, the temperature differential being limited only by the pressure difference which the containers will withstand without damage. On the other hand, the apparatus may be modified to provide a sterilizing period during which the temperature is held at the maximum after rising rapidly as in the apparatus of Fig. 6. In this event air may be admitted with the steam during the holding period to maintain the external pressure on the containers in equilibrium with the internal pressure attained at the final sterilizing temperature.

Although it is preferable to use a freshly filled can of the product being processed for receiving the thermocouple to control the cycle, in order that any variation in the heating characteristics of the product from batch to batch will manifest its effect upon the process controlling apparatus, it is possible in some cases to utilize the same can of material repeatedly as the controlling element. Also, under some circumstances a simulated product may be used repeatedly in a container fixed permanently in the reel 31 as the controlling element. As an example, when processing milk, a container filled with water will respond to the process in a manner very similar to the response of the containers filled with milk. Furthermore, it may be desirable in some instances to apply the thermocouple to the outside of the container since the outside surface temperature of the container is a function of the temperature of the material confined in it. Likewise the thermocouple may be replaced by a temperature responsive switch or the like in the container connected to effect direct control of the electrical system. Also other means of sensing the temperature of the material within the containers such as an optical pyrometer may be utilized to actuate the control system, the principal requirement being that the actual temperature of the material being processed within the containers is utilized directly to effect control of the various phases of the sterilizing process.

From the foregoing explanation of the exemplary structure and of the operation of the mechanism and the several control systems set forth herein, it will be apparent that the new methods and improved sterilizing apparatus provided by this invention are especially well adapted to effect full sterilization of food materials confined in containers with the least deleterious effect upon the quality of the product. This is accomplished through heating the material being processed as rapidly as possible to a high sterilizing temperature and then cooling it quickly to storage temperature, whereby the material is not subjected to damage by heat through long exposure yet is heated to a sufficiently high temperature and long enough to effect sterility.

Although specific examples of sterilizing apparatus illustrative of the present invention have been set forth in detail to afford a full disclosure of practical, useful embodiments of the invention, it is to be understood that other arrangements of the processing apparatus and different control systems may be utilized by those familiar with the art without departing from the spirit and scope of this invention as defined by the subjoined claims.

The invention having now been fully described, what is claimed is:

1. The method of sterilizing material confined with headspace in sealed containers, that comprises revolving a sealed container of the material about a horizontal axis at such a speed that centrifugal force acting on the outermost portion of the revolving material is slightly less than the force of gravity to effect optimum agitation of the material, continuously sensing the temperature of the material in the container as its revolves, subjecting the revolving container to the influence of an atmosphere of fluid heating medium under pressure, increasing the pressure of the fluid heating medium in response to increases in the temperature of the material being sterilized as it is sensed while revolving to maintain predetermined pressure and temperature differentials between the exterior and the interior of the container, then when the material in the container becomes heated to a predetermined maximum temperature subjecting the revolving container to the influence of a fluid cooling medium in an atmosphere under pressure, decreasing the pressure of the cooling atmosphere in response to reduction of the temperature of the material as it is sensed while cooling to maintain a predetermined pressure differential on the container, and stopping the revolving and heat exchanging operations when the material in the container becomes cooled to a predetermined minimum temperature.

2. In apparatus for heat processing material confined in containers while subjecting the containers of material to end-over-end agitation, a retort, a container carrying reel mounted within said retort for rotation about a horizontal axis, driving mechanism connected to rotate said reel at a speed to subject the contents of containers carried thereon to end-over-end agitation for rapid heating or cooling, a valve arranged to admit heating fluid into said retort, valves arranged to admit pressure fluid into and to release pressure fluid from said retort, an instrument connected to indicate the pressure of the fluid within said retort, a valve arranged to admit fluid into said retort, and a temperature measuring instrument operatively connected to measure and indicate the temperature of the contents of one of the containers carried on said reel while said reel is rotating, whereby the pressure within said retort may be regulated to balance the pressure within the containers being processed by so operating said valves as to establish within said retort a pressure externally of the containers as indicated by said pressure indicating instrument that is substantially equal to the internal pressure within the containers which corresponds to the temperature of the container contents as indicated by the temperature measuring instrument while subjecting the rotating containers successively to the influence of heating fluid admitted through said heating fluid valve and then to cooling fluid admitted through said cooling fluid valve, the arrangement being such that the material is heated and then cooled as quickly as possible to preserve its qualities while avoiding damage to the containers that might otherwise result from excessive difference between the external and the internal pressures.

3. In sterilizing apparatus for processing food sealed in containers, a retort arranged to confine containers of material being processed, adjustable fluid pressure regulating apparatus operatively connected to regulate the pressure of processing fluid within said retort, power operated apparatus operatively arranged to move containers within said retort during processing for agitating their contents to facilitate heat transfer, temperature responsive apparatus operatively connected to respond to the temperature of the food within a container moving in said retort, starting control apparatus operative when actuated to start said power operated container moving apparatus and to admit heating steam to said retort under control of said pressure regulating apparatus, a control connection between said container temperature responsive apparatus and said fluid pressure regulating apparatus and operative to effect increase in the pressure of the steam within said retort in accordance with increase in the temperature of the food within the container in a manner to balance the external pressure on the container with the internal pressure therein, process control apparatus responsive to said container temperature responsive apparatus and operative when the temperature of the food within the container reaches a predetermined maximum to shut off the heating steam and to admit replacement air and cooling water, the pressure of the air being reduced under control of said temperature responsive apparatus operating said pressure regulating apparatus to balance the external and internal pressures as the container is cooled by the water, and stopping control apparatus responsive to said container temperature responsive apparatus and operative when the temperature of the container reaches a predetermined minimum to shut off the cooling water and to stop said power operated container moving apparatus to terminate the processing cycle.

4. In an apparatus for sterilizing food products in sealed containers, a retort arranged to enclose containers of food being sterilized, a rotatable container carrying rotor mounted within said retort, power driven mechanism selectively operable to rotate said rotor for subjecting material in containers thereon to end-over-end agitation, an automatic control system for said apparatus including a starting switch operable when actuated to cause said power driven mechanism to effect rotation of said container carrying rotor and simultaneously to admit heating steam to said retort, an exhaust valve arranged to release air from said retort as it is displaced by entering steam, control apparatus responsive to the temperature of the steam within said retort and operative to close said exhaust valve when the steam temperaure rises to a predetermined value, a pressure control system operative to control the pressure of the steam within said retort, automatically timed adjusting means operative to adjust said steam pressure control system in a manner to increase the steam pressure gradually at a predetermined rate, control mechanism responsive to the temperature of the steam when it increases to a predetermined maximum, a timer connected to be started by said steam temperature responsive control mechanism in responding to the maximum steam temperature and arranged to operate for a predetermined sterilizing time interval, control means responsive to operation of said timer at the expiration of the time interval and operative to shut off the steam and admit air under pressure to said retort, a water supply system arranged to spray water on said rotor for cooling the containers, control means responsive to said timer and operative thereby at the expiration of the time interval to admit cooling water through said supply system to cool the containers, control means responsive to pressure of water in said supply system and operative thereby to initiate timed adjustment of said pressure control system to decrease the air pressure in said retort as the containers are cooled by the cooling water, and a stopping switch responsive to the temperature of the spent cooling water as it drains from the containers and operative when the water temperature is reduced to a predetermined minimum to stop rotation of said rotor, turn off the cooling water and condition the control system for restarting.

5. In an agitating sterilizer, a retort, a container carrying reel mounted for rotation about a horizontal axis within said retort and presenting on its periphery a series of spaced longitudinal basket receiving slots flanged by basket retaining lips, and a plurality of container holding baskets presenting rims adapted to engage said retaining lips when said baskets are slid endwise into said slots for restraining said basket against radial displacement under centrifugal force when said reel is rotating, whereby containers of mobile material held in said baskets may be retained on and rotated with said reel end-over-end to agitate the material while it is subjected to processing influences within said retort.

6. In apparatus for processing material sealed in containers while being agitated by the end-over-end method, a retort constituted by a horizontally disposed housing open at one end, a movably mounted door fitted to close the open end of said housing, a reel rotatably mounted within said housing and presenting longitudinal slots upon its periphery to receive containers, baskets each arranged to retain a row of containers and adapted to fit endwise into said reel slots, a stop ring secured at the inner end of said reel in position to close the ends of said slots for limiting the extent of inward movement of said baskets, and a stop ring secured to the inner surface of said door in position when said door is closed to prevent outward movement of said baskets while they are rotating with said reel.

7. In apparatus for processing material confined in sealed containers while agitating the material by end-over-end rotation of the containers, a retort adapted to confine heat exchanging fluid, a container carrying reel rotatably mounted within said retort said reel presenting on its periphery longitudinal slots for receiving containers, baskets adapted to be received in said slots and each arranged to retain a row of containers in side-by-side relationship, and resilient elements disposed within said container receiving slots and arranged to engage the containers in said baskets in a manner to force them outward into firm engagement with said baskets, whereby radial movement of the containers as said reel rotates is obviated to prevent marring of the container surfaces.

8. In an apparatus for processing material sealed in containers while being agitated by end-over-end rotation, a retort adapted to confine heat exchanging fluid, a reel for carrying containers of material being processed said reel being rotatably mounted within said retort, a shaft disposed concentrically of said reel and secured thereto substantially at its midplane, a tubular housing mounted to extend into said retort substantially to the midplane of said reel and adapted to receive said reel shaft, and a bearing in the inner end of said tubular housing disposed to rotatably support said reel shaft at a position adjacent to the midplane of said reel.

9. In apparatus for processing by the end-over-end agitation method material confined in sealed containers, a retort constituted by a housing closed at one end and open at the other end, a door movably mounted to close the open end of said housing, a reel rotatably mounted within said housing and adapted to support and rotate end-over-end a batch of containers while processing their contents, spray nozzles arranged in the top of said housing to spray water on containers as they rotate with said reel for cooling their contents, a spray nozzle mounted in the closed end of said housing in a position to direct a spray of water onto containers on the inner end of said reel, and a spray nozzle mounted in said movably mounted door in a position to direct a spray of water onto containers carried on the outer end of said reel.

10. In apparatus for sterilizing food products in sealed containers, a retort constituting a pressure chamber and presenting a loading opening, a movable door arranged to close said opening, locking means arranged to lock said door in closed position, power actuated container moving means disposed within said retort, a control system operative to effect selective continuous operation of said container moving means during processing, another control system operative to effect selective jogging operation of said container moving means during loading, and an interlock switch operatively associated with said door and its locking means and actuated thereby in such a manner that said continuously operating control system is rendered operative only when said door is locked in closed position and said jogging control system is rendered operative only when said door is unlocked or open.

11. In sterilizing apparatus for processing food material in sealed containers, a retort arranged to confine containers of material for processing under pressure, fluid pressure regulating apparatus operatively connected to regulate the fluid pressure within said retort, and control apparatus responsive to the temperature of the material within a container in said retort and operative to effect adjustment of said pressure regulating apparatus in accordance with changes in the temperature of the material, the arrangement being such that when steam is admitted to said retort the pressure therein is increased automatically in accordance with the increase in temperature within the container whereby the internal and external pressures on the container may be balanced and likewise when the steam is replaced by air the pressure is decreased automatically in accordance with the decrease in temperature within the container to balance the pressures as the container cools.

12. In apparatus for sterilizing food material confined in sealed containers, a retort for receiving containers of the material, control apparatus arranged to effect heating and cooling of material in said retort in accordance with a predetermined cycle and including a starting control and a stopping control, means to heat the material under control of said control apparatus, water supply apparatus arranged to be operated by said control apparatus to admit water into said retort to cool the material being processed, a drain conduit arranged to drain spent cooling water from said retort, and a temperature responsive element arranged to be responsive to the temperature of the spent cooling water flowing through said drain conduit and operative when the water temperature reaches a predetermined minimum to actuate said stopping control to terminate the cycle, whereby the cooling operation is discontinued when the containers are sufficiently cooled for removal from the retort.

13. In sterilizing apparatus for processing food or the like in sealed containers, a retort for receiving containers of food being sterilized, power actuated apparatus operative to move the containers within said retort to agitate their contents, a valve operatively arranged to admit steam to said retort to heat the containers therein, another valve arranged to admit water to said retort to cool the containers, a third valve arranged to admit air under pressure to said retort to replace steam condensed by the water, a fourth valve arranged to vent air from said retort, a control system for controlling a processing cycle in said retort said control system including a starting switch operative when closed to start said power actuated apparatus and to open said vent valve and said steam valve, a steam temperature sensitive switch responsive to the temperature of steam admitted into said retort and operative when the steam temperature increases to a predetermined value to close said vent valve, an adjustable pressure regulating system arranged to limit the pressure within said retort to a predetermined maximum, a temperature sensitive switch responsive to a maximum temperature condition and operative when the temperature reaches a predetermined sterilizing temperature to delimit a sterilizing period, control means responsive to action of said control system upon reaching the end of the sterilizing period and operative thereupon to close said steam valve and to open said air valve and said water valve, a pressure regulating system arranged to control said air valve and said vent valve to reduce the pressure in said retort as the containers are cooled by the water, and a temperature sensitive switch arranged to respond to a minimum temperature condition and operative when the temperature is reduced to a predetermined minimum to close said water valve and to stop said power actuated apparatus thereby terminating the processing cycle.

14. In apparatus for processing material confined in sealed containers while agitating the material by end-over-end rotation of the containers, a retort adapted to confine heat exchanging fluid, a container carrying reel rotatably mounted within said retort said reel presenting on its periphery securing means arranged to retain rows of containers in side-by-side relationship, and resilient elements arranged to engage the containers in a manner to force them into firm engagement with said securing means, whereby movement of the containers relative to said reel as it rotates is obviated to prevent marring of the container surfaces.

15. In apparatus for processing comestibles by the end-over-end agitation method, a pressure vessel, a reel rotatably mounted within said pressure vessel and presenting upon its periphery a plurality of angularly spaced longitudinal trackways extending substantially from end to end thereof, and a plurality of container receiving baskets adapted to be received respectively in said longitudinal trackways each basket being arranged to carry a row of comestible containers in side-by-side relationship and to secure them on said reel with their axes disposed radially of the axis of rotation of said reel for rotation end-over-end when said reel is rotated to agitate the comestibles while being heat processed in said pressure vessel.

16. In apparatus for processing food or the like in sealed containers while under end-over-end agitation, a retort adapted to contain a heat exchanging medium, a container carrying reel rotatably mounted within said retort for revolving containers end-over-end in the heat exchanging medium, power actuated driving means selectively operable to rotate said reel, a temperature indicating instrument operatively connected to indicate the temperature of the food in a container rotating with said reel, a control valve arranged to admit pressure fluid into said retort while said reel is rotating, an adjustable pressure responsive instrument connected to respond to the fluid pressure within said retort and operative to control said fluid admitting valve accordingly, and means to adjust said pressure responsive instrument to increase or decrease the pressure to be maintained within said retort in accordance with the temperature of the food indicated by said temperature indicating instrument, the arrangement being such that steam may be admitted through said fluid control valve to sterilize food in containers carried by said reel and the pressure of the steam gradually increased by adjusting said pressure responsive instrument in accordance with said temperature indicating instrument to maintain a balance between the fluid pressure within the retort and the fluid pressure within the containers of food being processed as indicated by the temperature thereof.

17. In a sterilizer for processing food confined in sealed containers, a retort arranged to receive containers of food being processed, a control system for controlling a sterilizing cycle including a temperature responsive instrument connected to respond to the temperature of the food within a container in said retort, a pressure regulating instrument responsive to said temperature responsive instrument and operative to control the fluid pressure within said retort in accordance with the temperature of the food being processed, means arranged to admit steam to said retort under control of said pressure regulating instrument in such a manner that the retort pressure increases in accordance with and in response to increases in the pressure within the containers as represented by the increase in temperature of the food in the container sensed by said temperature responsive instrument to maintain a balance between the internal and the external pressures on the containers, control means responsive to a predetermined maximum sterilizing temperature within the container and operative in response to said temperature responsive instrument when the food is heated to that temperature to discontinue the admission of steam to said retort and to admit cooling water and air under pressure into said retort, the air being under control of said pressure regulating instrument in order that the pressure thereof may be reduced in accordance with the reduction in pressure within the containers as they are cooled by the cooling water, and control means responsive to a predetermined minimum temperature of the food within the container and operative by said temperature responsive instrument when the food cools to that temperature to discontinue the admission of cooling water to said retort.

18. In a sterilizer for processing food confined in sealed containers, a retort arranged to receive containers of food being processed, a control system for controlling a sterilizing cycle in said retort including a temperature responsive instrument connected to respond to the temperature of the food within a container in said retort, a pressure regulating instrument responsive to said temperature responsive instrument and operative to control the fluid pressure within said retort in accordance with the temperature of the food in the container, means arranged to admit steam to said retort under control of said pressure regulating instrument as actuated by said temperature responsive instrument in such a manner that the retort pressure increases in accordance with the increase in the pressure within the containers as represented by the increase in temperature of the food in the container sensed by said temperature responsive instrument to maintain a balance between the internal and the external pressures on the containers in said retort, and control means responsive to said temperature responsive instrument and operative when the food within the container is heated to a predetermined maximum sterilizing temperature as sensed by said temperature responsive instrument to discontinue the admission of steam to said retort and to admit cooling water and air under pressure into said retort the air under pressure being under control of said pressure regulating instrument whereby the pressure thereof is reduced in accordance with the reduction in the pressure within the containers as represented by the decrease in temperature sensed by said temperature responsive instrument while they are being cooled by the cooling water.

19. In apparatus for processing comestibles in containers by the end-over-end agitation method, a pressure vessel, a reel rotatably mounted on a horizontal axis within said pressure vessel and presenting upon its periphery a plurality of angularly spaced longitudinally disposed container receiving trackways extending substantially from end to end thereof, and a plurality of container moving elements adapted to be received endwise respectively in said longitudinal trackways and each arranged to carry into a trackway a row of comestible containers in spaced side-by-side relationship with their axes disposed transversely of the axis of rotation of said reel for revolving end-over-end when said reel is rotated to agitate the comestibles while being heat processed in said pressure vessel.

20. In apparatus for sterilizing food products confined in sealed containers, a retort constituting a pressure chamber and presenting a loading opening for receiving containers of food products to be sterilized, a movable door arranged to close and seal said loading opening, container processing means arranged to operate within said retort, a control system operative to effect selective operation of said container processing means, and an interlock device in said control system operatively associated with said door and actuated concurrently therewith in such a manner that said container processing control system is rendered operative only when said door is closed and sealed.

21. In sterilizing apparatus for processing food material confined in sealed containers, a retort arranged to confine containers of material under pressure, an adjustable pressure regulator operatively connected to regulate the pressure within said retort, a valve operatively connected to admit steam to said retort under the control of said pressure regulator for heating containers of food material being processed, automatic control apparatus operatively connected to change the adjustment of said pressure regulator at a predetermined rate in a manner to increase the pressure of the steam in said retort in balance with the increase in pressure within the containers as their contents are heated, a valve operatively connected to admit air under pressure to said retort under the control of said pressure regulator for replacing the steam in said retort after a sterilizing operation, and automatic control apparatus operatively connected to change the adjustment of said pressure regulator at a predetermined rate in a manner to reduce the pressure of the air in said retort in balance with the reduction in pressure within the containers as their contents are cooled after sterilizing.

22. In an apparatus for processing material in sealed containers, a housing arranged to receive containers for processing, means to heat containers within said housing, a cooling water supply conduit, a valve operable to admit cooling water from said conduit into said housing to cool containers therein, a drain conduit connected to drain spent cooling water from said housing, and temperature sensitive control apparatus responsive to the temperature of the spent cooling water and operative when the temperature thereof is reduced to a predetermined minimum to close said cooling water admitting valve, the arrangement being such that the cooling water is turned off automatically when the temperature of the spent cooling water indicates that the containers have been cooled sufficiently.

References Cited in the file of this patent

UNITED STATES PATENTS

| 1,385,599 | White | July 26, 1921 |
| 2,298,693 | Griffin et al. | Oct. 13, 1942 |
| 2,330,967 | Griffin et al. | Oct. 5, 1943 |
| 2,517,542 | Clifcorn et al. | Aug. 8, 1950 |
| 2,624,266 | Colburn et al. | Jan. 6, 1953 |

U. S. DEPARTMENT OF COMMERCE
PATENT OFFICE

CERTIFICATE OF CORRECTION

Patent No. 2,816,841                  December 17, 1957

Lawrence E. Kaap

It is hereby certified that error appears in the printed specification of the above numbered patent requiring correction and that the said Letters Patent should read as corrected below.

Column 10, line 71, strike out "outer" second occurrence; column 26, line 4, before "fluid" insert --cooling--; column 27, line 32, for "flanged" read --flanked--; column 30, lines 59 and 60, for "mainiatn" read --maintain--.

Signed and sealed this 22nd day of April 1958.

(SEAL)
Attest:
KARL H. AXLINE

Attesting Officer

ROBERT C. WATSON
Commissioner of Patents